US009106875B2

(12) United States Patent  
Chang

(10) Patent No.: US 9,106,875 B2  
(45) Date of Patent: Aug. 11, 2015

(54) SYSTEM AND METHOD FOR CREATING A RUN-TIME COLOR-CONVERSION LOOK-UP TABLE

(71) Applicant: Michael M. Chang, Redondo Beach, CA (US)

(72) Inventor: Michael M. Chang, Redondo Beach, CA (US)

(73) Assignee: KYOCERA Document Solutions Inc. (JP)

( * ) Notice: Subject to any disclaimer, the term of this patent is extended or adjusted under 35 U.S.C. 154(b) by 107 days.

(21) Appl. No.: 13/644,969

(22) Filed: Oct. 4, 2012

(65) Prior Publication Data  
US 2014/0098387 A1 Apr. 10, 2014

(51) Int. Cl.  
G06F 15/00 (2006.01)  
G06K 1/00 (2006.01)  
H04N 1/60 (2006.01)

(52) U.S. Cl.  
CPC .................................. H04N 1/6058 (2013.01)

(58) Field of Classification Search  
None  
See application file for complete search history.

(56) References Cited

U.S. PATENT DOCUMENTS

| 5,398,120 | A | 3/1995 | Friedman et al. |
| 6,850,342 | B2 | 2/2005 | Woolfe et al. |
| 7,019,868 | B2 | 3/2006 | Chang et al. |
| 7,844,109 | B2 * | 11/2010 | Matsuura ....................... 382/167 |
| 2002/0067848 | A1 * | 6/2002 | Queiroz et al. ............... 382/162 |
| 2005/0249408 | A1 | 11/2005 | Haikin |
| 2007/0229862 | A1 | 10/2007 | Derhak et al. |
| 2008/0037060 | A1 * | 2/2008 | Ono et al. ..................... 358/1.15 |
| 2009/0285475 | A1 | 11/2009 | Suzuki |
| 2010/0194773 | A1 * | 8/2010 | Pan et al. ...................... 345/590 |
| 2012/0038938 | A1 | 2/2012 | Oh et al. |

OTHER PUBLICATIONS

Extended European Search Report and Opinion for App. No. EP 13187105.5, mailed Jul. 1, 2014, 7 pages.

* cited by examiner

Primary Examiner — Vincent Rudolph  
Assistant Examiner — Michael Burleson  
(74) Attorney, Agent, or Firm — McDonnell Boehnen Hulbert & Berghoff LLP

(57) ABSTRACT

A method for creating a run-time color-conversion look-up table is provided. A conceptual representation of a slice of a color conversion object is presented. The color conversion object is defined by a color coordinate system having a neutral axis and a plurality of color axes. The slice is defined by a plurality of grid points on the color coordinate system that are in a common plane orthogonal to the neutral axis. In addition, the slice is bound along a plurality of faces of the color conversion object for which at least one of the plurality of color axes is at a minimum or maximum value. The method further includes applying design rules for certain grid points and determining outputs for other grid points. The outputs for the slice are stored in a portion of the look-up table. A tool for creating a 3D look-up table is also described.

24 Claims, 31 Drawing Sheets

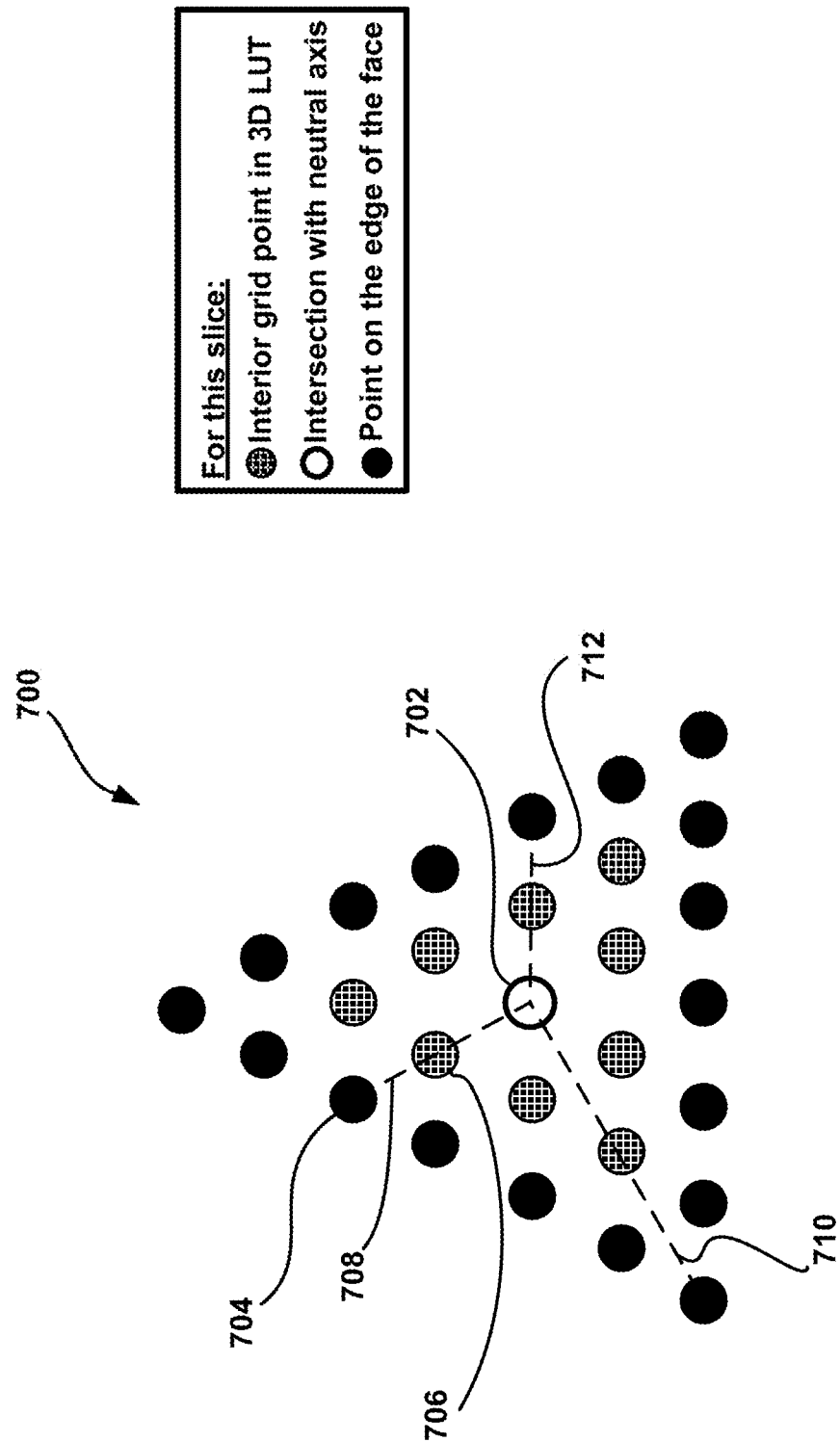

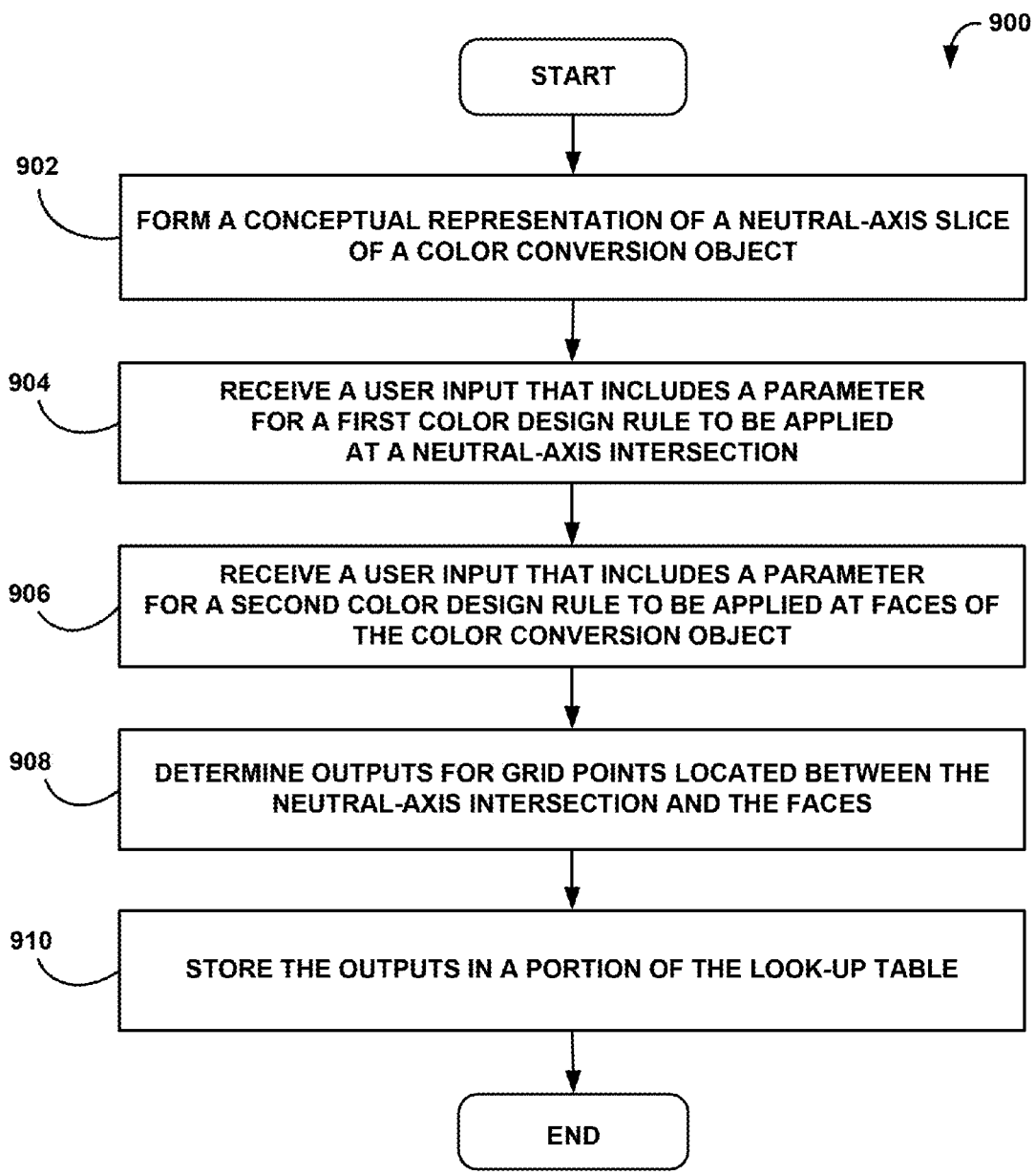

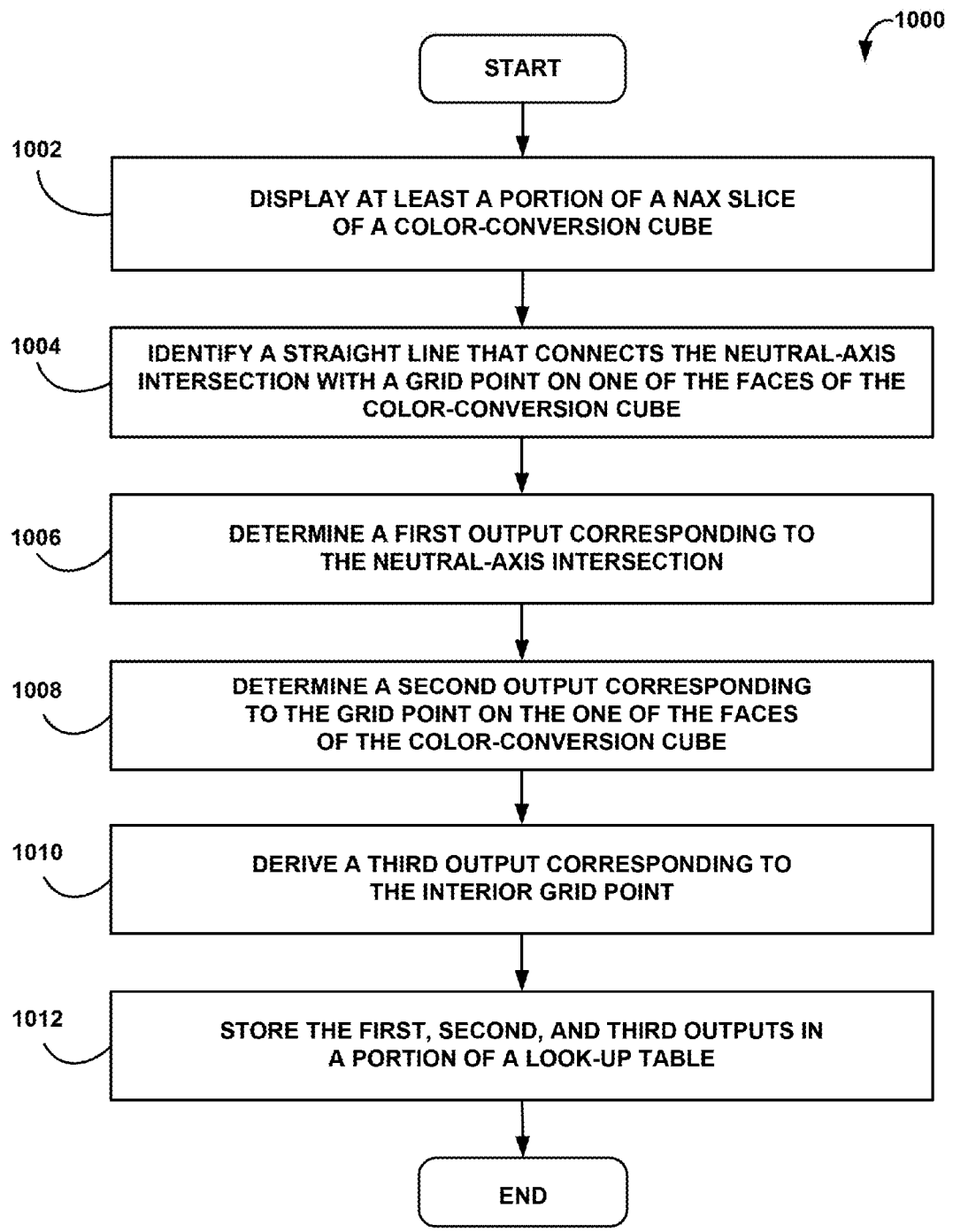

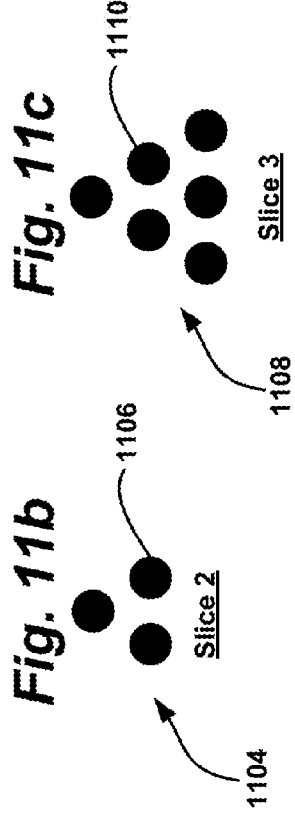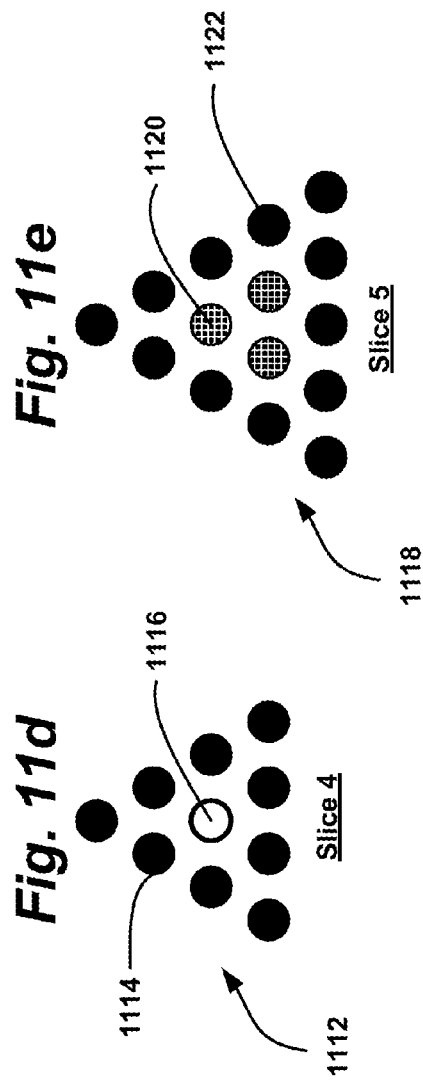

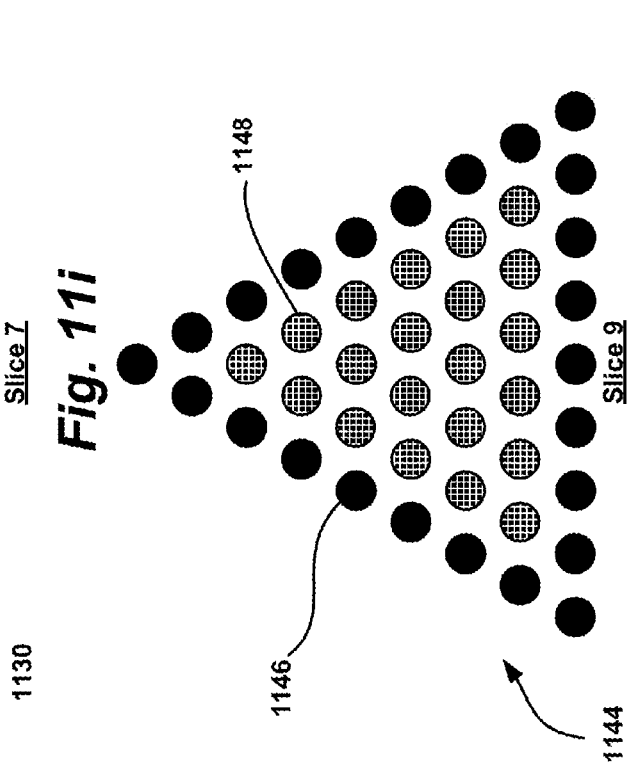
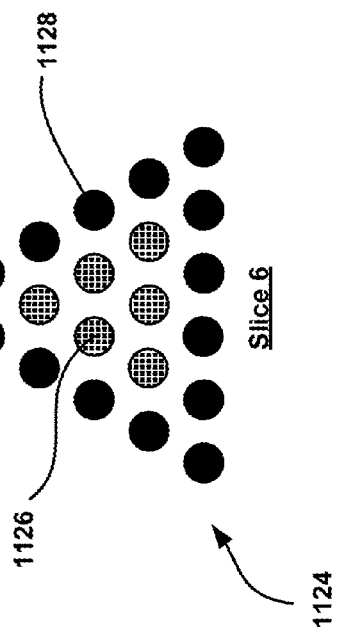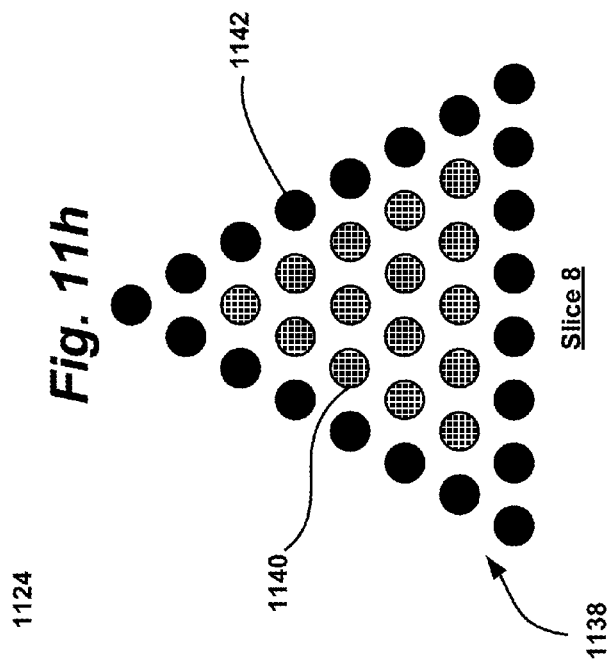

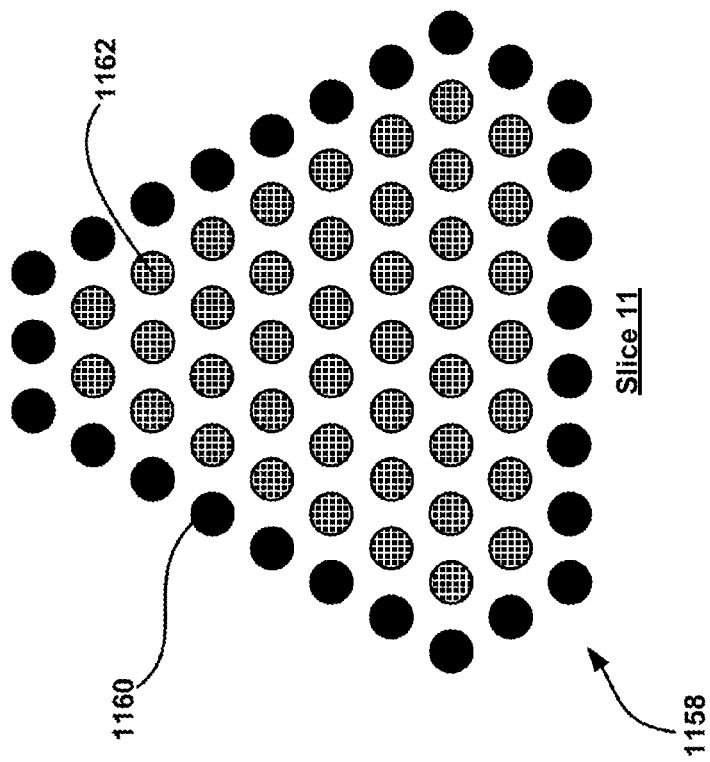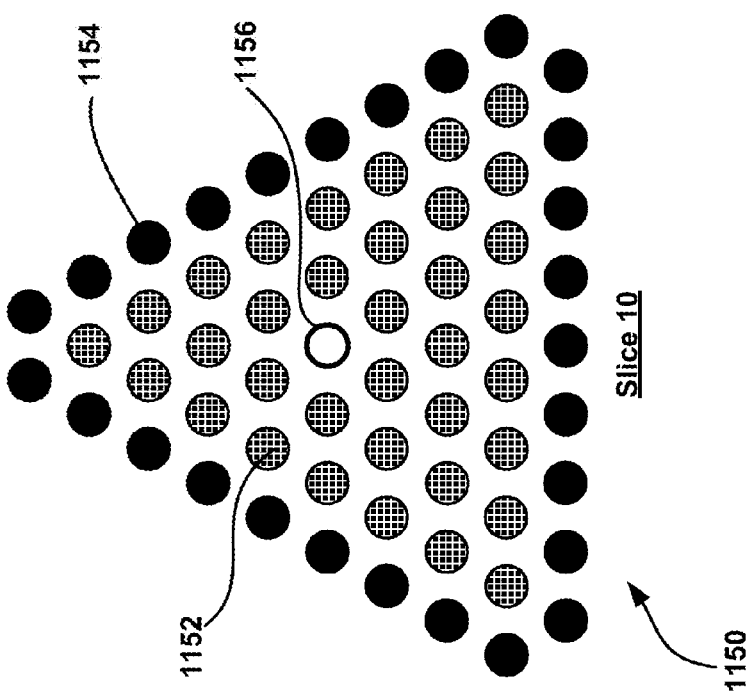

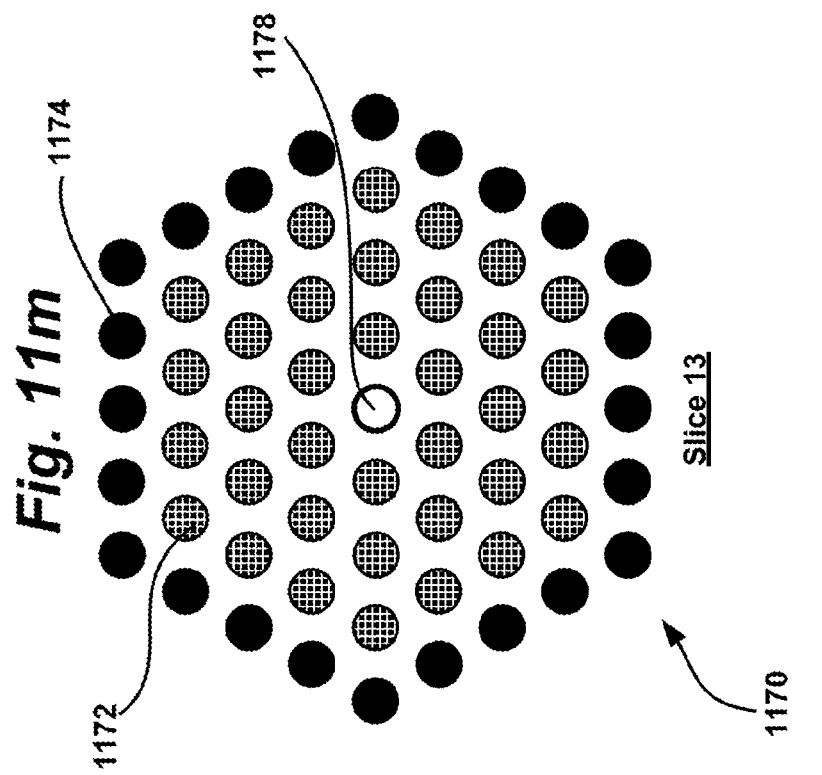
Fig. 11m  Slice 13
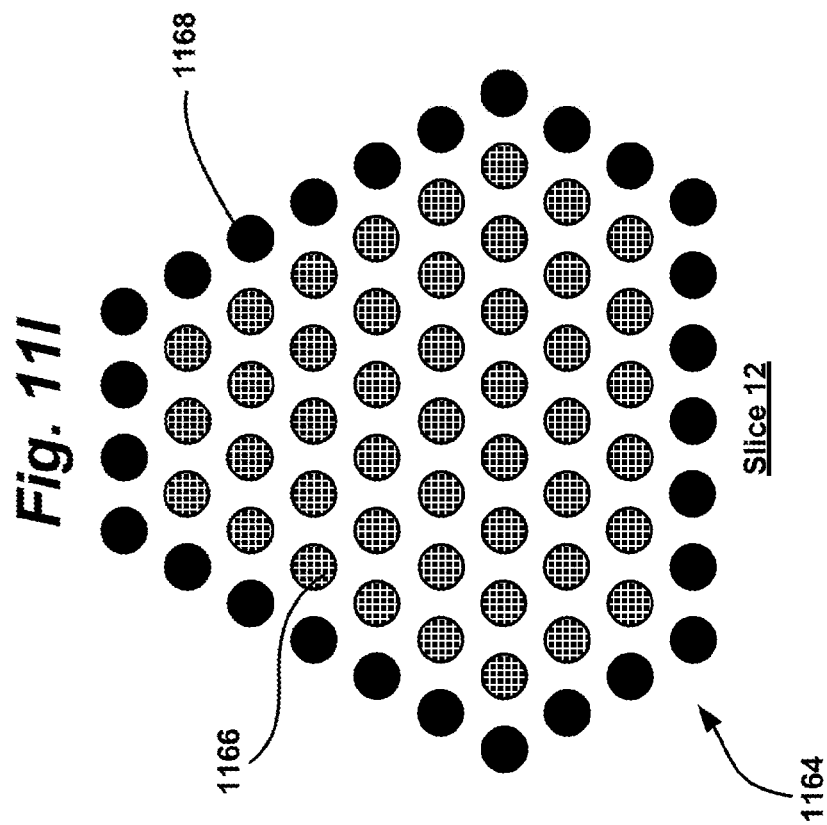
Fig. 11l  Slice 12

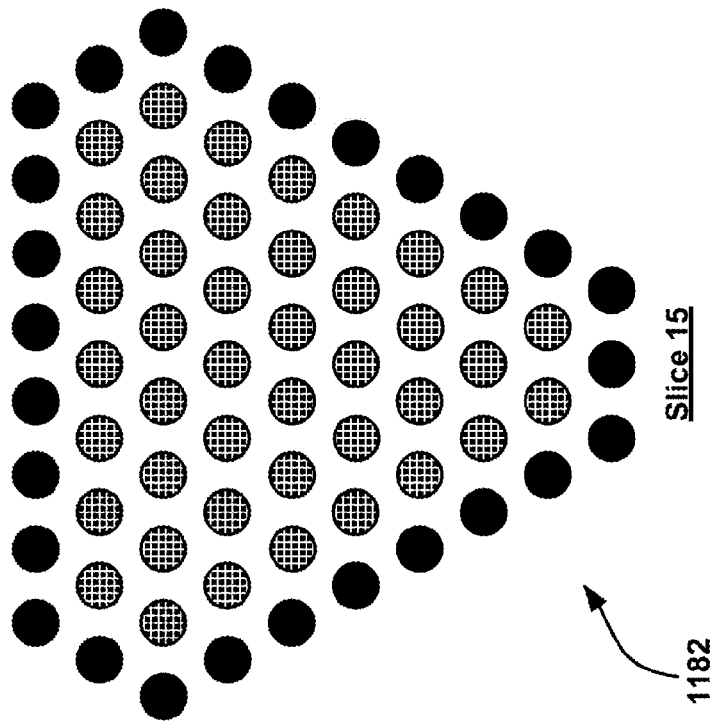
Fig. 11o  Slice 15  1182
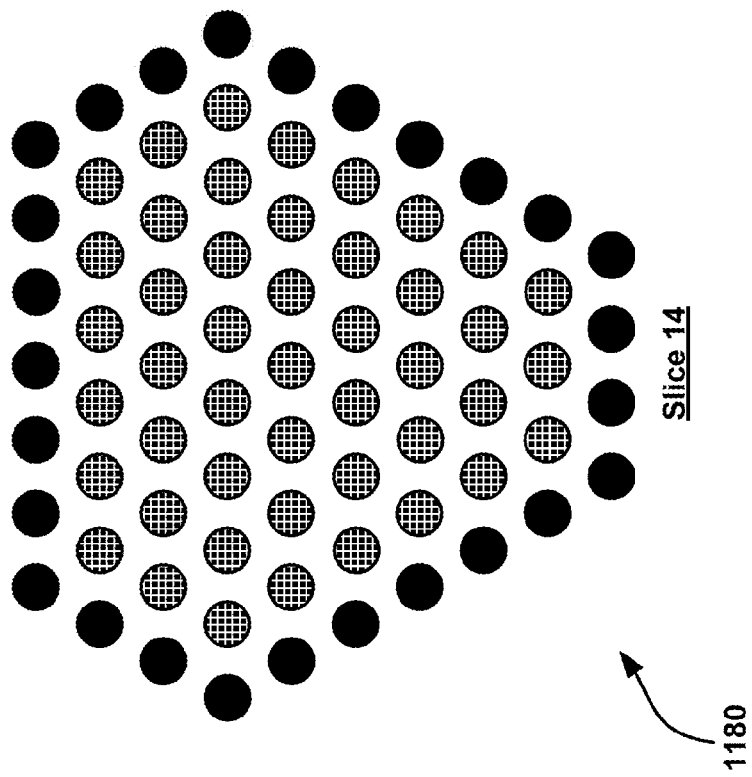
Fig. 11n  Slice 14  1180

Slice 17

1186

Slice 16

1184

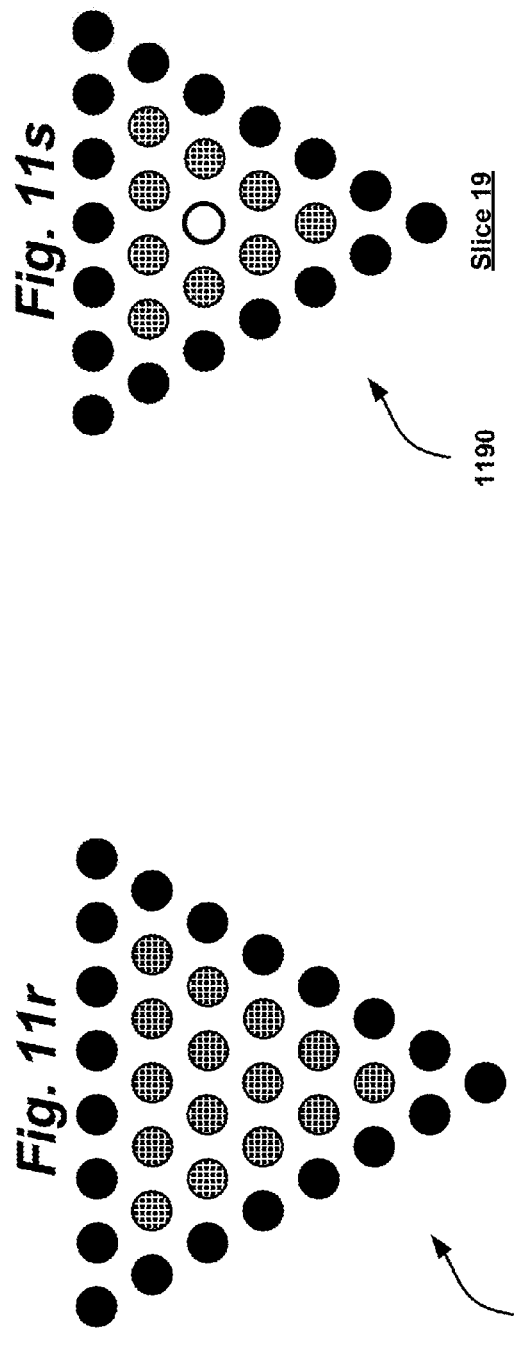
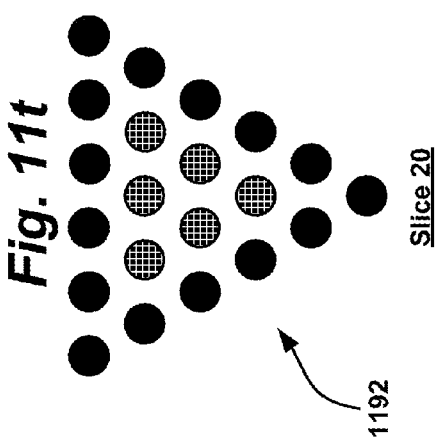

Slice 22
1196

Slice 23
1198

Slice 24
11100

Slice 25
11102

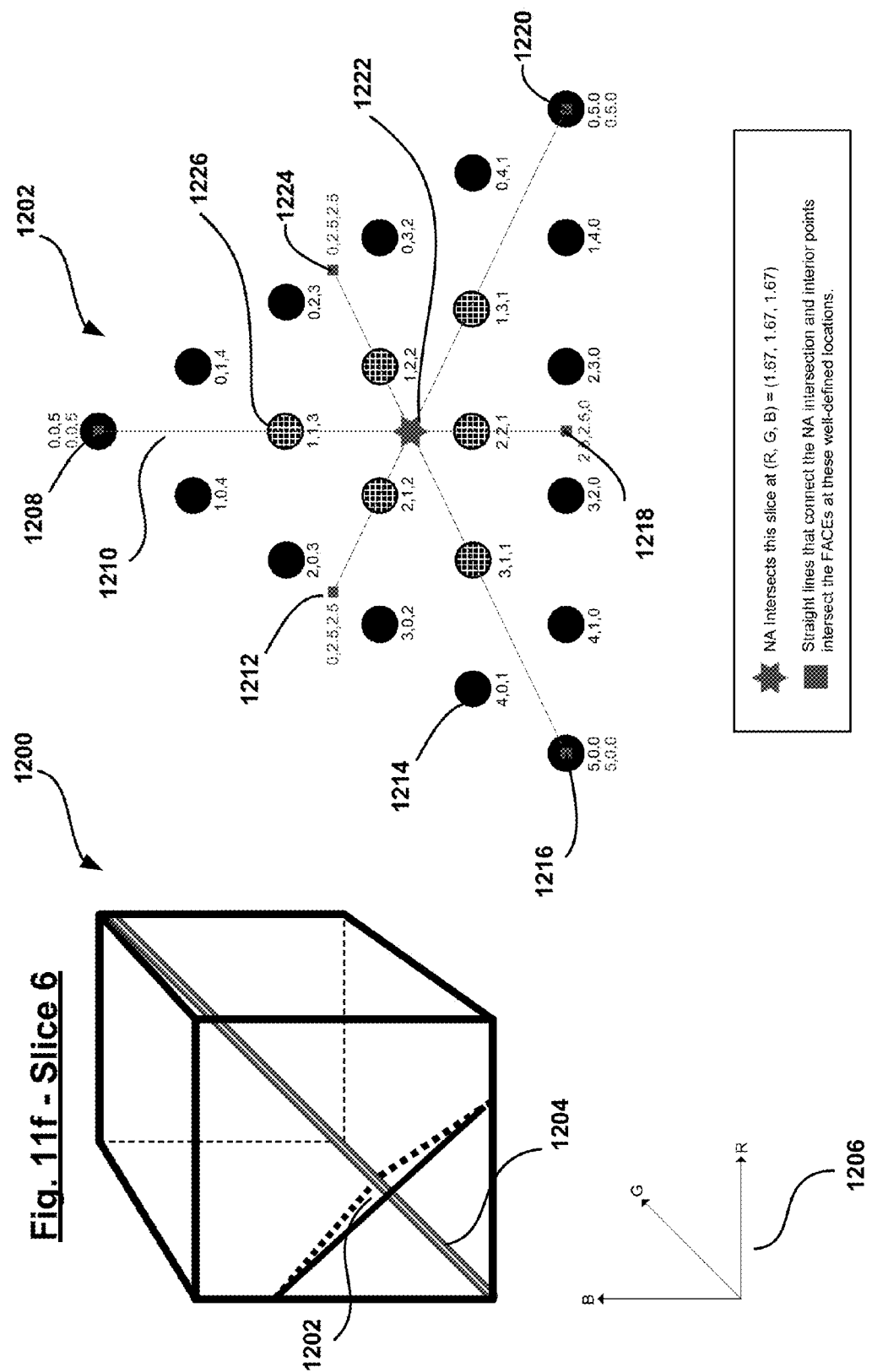

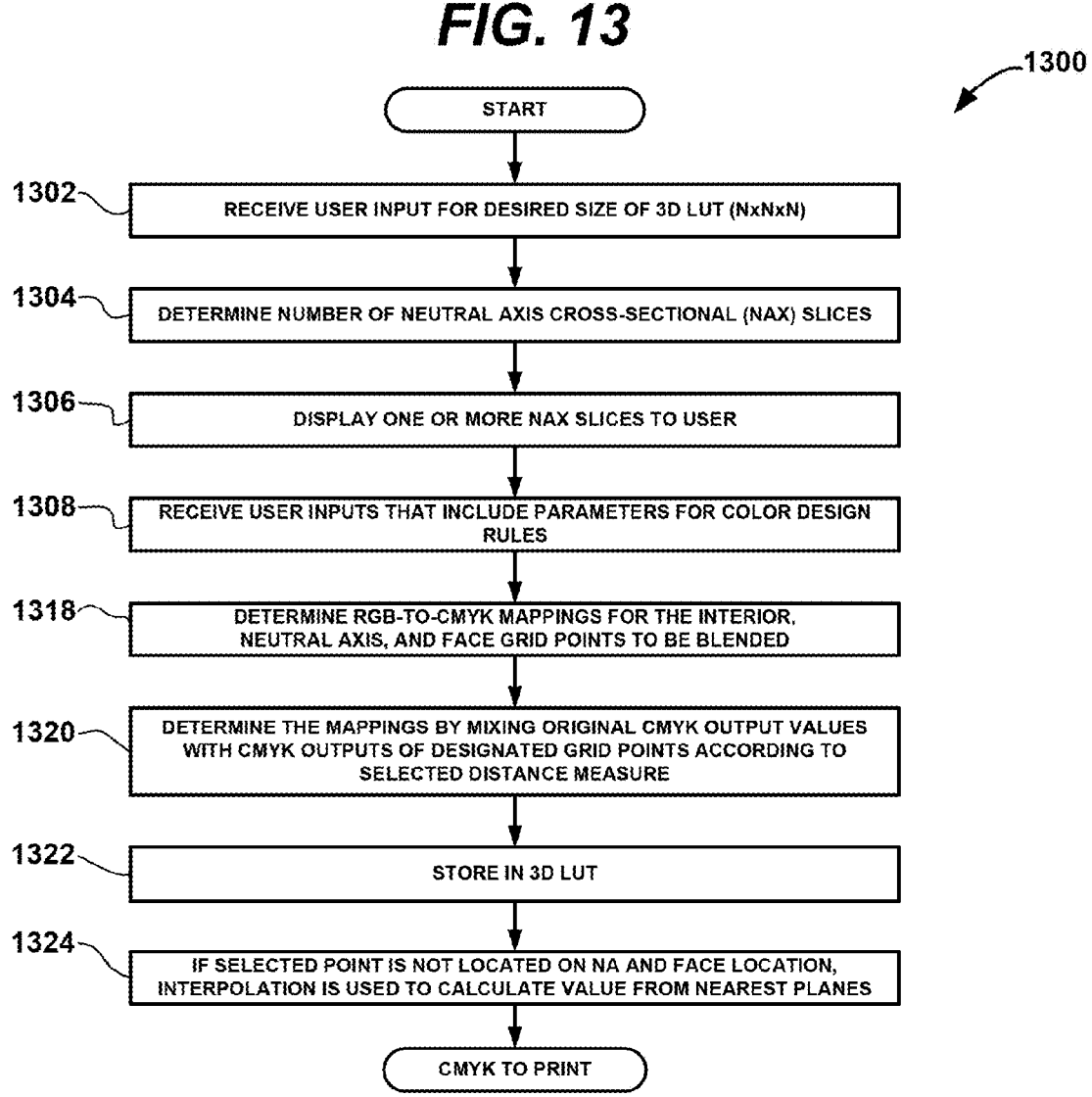

FIG. 22
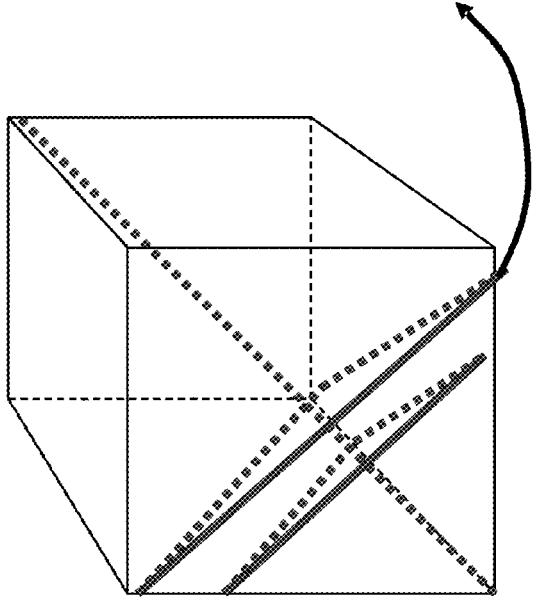
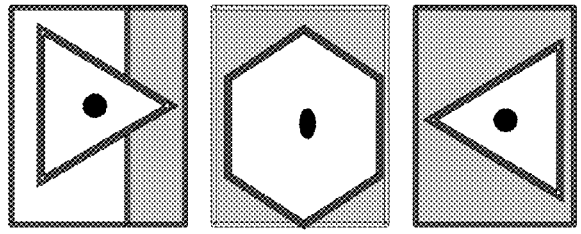
For the 9x9x9
3D-LUT slice
by-slice:
21 of 25 NAX
slices
completed.

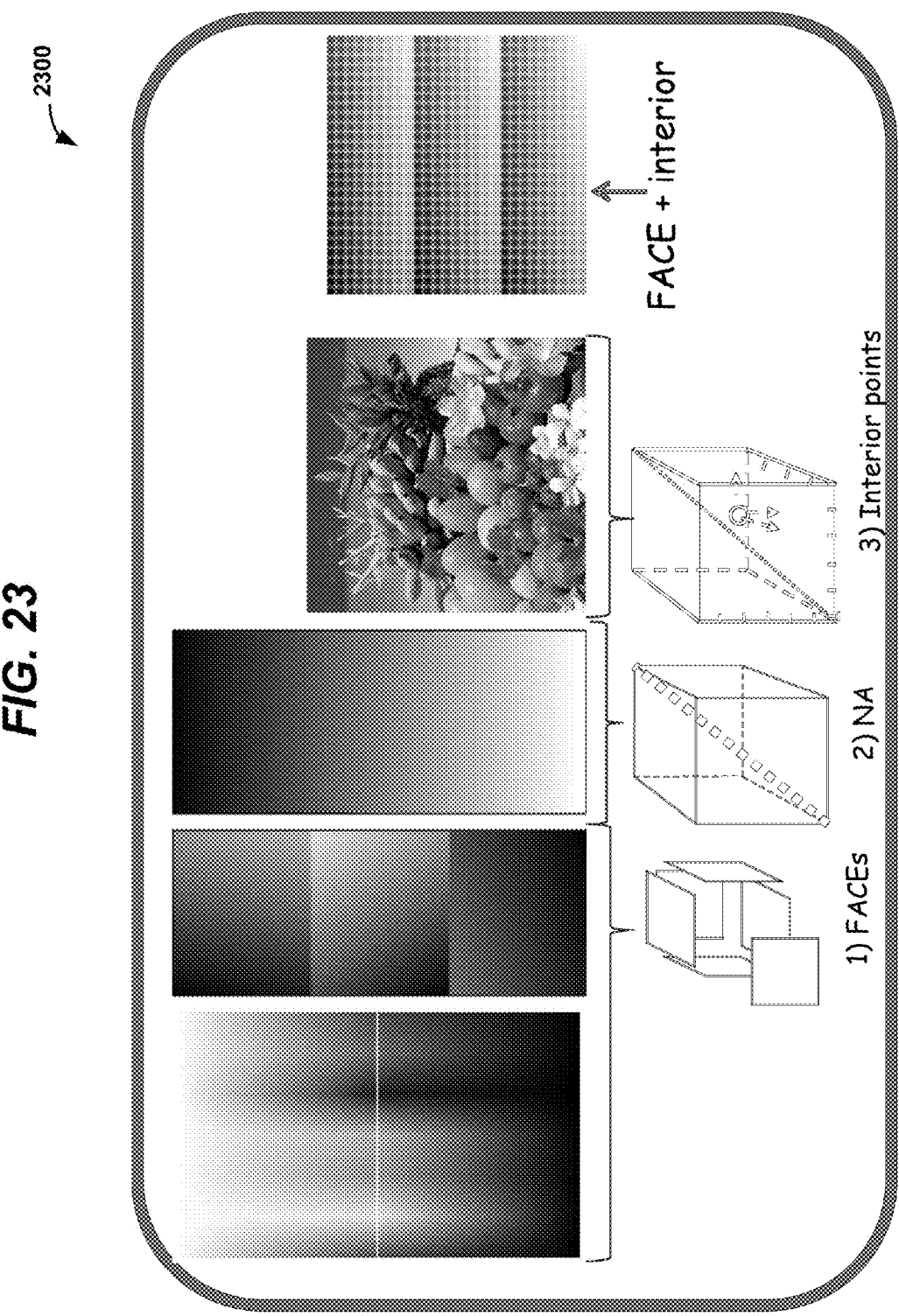

SYSTEM AND METHOD FOR CREATING A RUN-TIME COLOR-CONVERSION LOOK-UP TABLE

FIELD

The present invention relates to creating a color-conversion look-up table.

BACKGROUND

It can be a challenge to accurately reproduce colors from a first device, such as a computer monitor, to colors on a second device, such as an image forming device (e.g. color printer). Monitors typically display colors using red, green, and blue (RGB) pixels, while most modern color printers typically display using cyan, magenta, yellow, and black (CMYK) inks or toners. The reproduced color quality may be evaluated based on how true the reproduced colors on the printed page are to the source color on a monitor. In other cases, the color quality may be evaluated based on preferences of the user, such as preferences toward particular skin tones, for example. The mismatched color gamuts between monitors and color printers require color conversions that account for behavior at the gamut boundaries (i.e. minimum and maximum color outputs), among other things.

To perform such color conversion, the second device (or an intermediate device, such as a computer running software) can be configured to map colors from RGB to CMYK. First, source colors for a print job are represented as RGB values, such as 8 bits for each color, corresponding to 24 total bits. In the case of a color printer, a print controller may then perform color conversion to map the RGB values to CMYK values to reproduce the colors on a printed page. The relationships between the two color spaces may be defined as follows:

$$(C,M,Y,K)=f(R,G,B) \quad \text{Equation 1:}$$

$$C=f_C(R,G,B) \quad \text{Equation 2:}$$

$$M=f_M(R,G,B) \quad \text{Equation 3:}$$

$$Y=f_Y(R,G,B) \quad \text{Equation 4:}$$

$$K=f_K(R,G,B) \quad \text{Equation 5:}$$

The functions listed in equations 1-5 above do not have simple global definitions and are instead defined as point-to-point mappings. While the print controller (or other device) could theoretically perform such color conversion computationally for each pixel, the large number of calculations involved makes this an unattractive solution because it would likely slow the printing process. Instead, typical color conversions use one or more Look-Up Tables (LUTs) having previously calculated or empirically determined values stored therein. So, instead of calculating CMYK values from RGB values, the color conversion involves using the RGB values as an index to access corresponding CMYK values in the one or more LUTs. The printer then uses the determined CMYK values to "mark" the page, such as by depositing corresponding amounts of ink or toner.

For example, human skin and green grass may have RGB values of (228, 174, 160) and (95, 200, 12), respectively, according to a particular color space. Using one or more suitable look-up tables, the color conversion could output the mapped respective CMYK values (0, 84, 71, 23) and (140, 0, 247, 0) in a second color space, to be used in printing.

The size and configuration of the LUTs can influence printing speed, printing quality (e.g. accuracy of color reproduction and transitions), and cost (e.g. memory size and type). Of primary interest to the color designer is to create color-conversion LUTs that result in design goals (such as colorimetric matches or preferential coloring) to be achieved.

Thus, an improved method for creating a LUT that provides accurate color conversion and transitions, without sacrificing printing speed or cost, is desired.

SUMMARY

Various embodiments set forth herein assist in designing a run-time color LUT. The methods described below are preferably implemented on a computer running software, in order to create a LUT to be used for a particular device, such as an image forming device. Other implementations are possible as well.

In accordance with a first embodiment, a method for creating a run-time color-conversion look-up table is provided. A conceptual representation of a slice of a color conversion object is presented to a user on a computer output device. The color conversion object is defined by a color coordinate system having a neutral axis and a plurality of color axes. Each color axis includes values ranging from a respective minimum value to a respective maximum value, while the neutral axis includes values ranging from a minimum colorant amount (i.e. white) to a maximum colorant amount (i.e. black). The slice is defined by a plurality of grid points on the color coordinate system that are in a common plane orthogonal to the neutral axis. In addition, the slice is bound along a plurality of faces of the color conversion object for which at least one of the plurality of color axes is at a minimum or maximum value. In a preferred embodiment, the color conversion object is a cube defined by three color axes, with the diagonal neutral axis spanning from an origin of the color axes (located at one vertex of the cube) to the vertex of the cube opposite that origin.

The method according to the first embodiment further includes (a) receiving a user input that includes a parameter for a first design rule to be applied to an intersection of the slice with the neutral axis and (b) receiving a user input that includes a parameter for a second design rule to be applied to outputs at grid points located on at least one of the faces of the color conversion object. The method also includes determining outputs for grid points located between the intersection and the faces by calculating a transition between the first design rule and the second design rule. This transition may, for example, be calculated based on a third design rule, such as distance of a particular interior grid point to the intersection and/or the face(s). The outputs for the slice are stored in a portion of the look-up table.

According to another embodiment, a method for creating a three-dimensional color-conversion look-up table includes displaying at least a portion of a neutral-axis cross-sectional slice of a color-conversion cube for converting between a first color space associated with a first device to a second color space associated with a second device. The at least one neutral-axis cross-sectional slice may include, for example, a plurality of co-planar grid points located thereon, including a plurality of interior grid points located between (1) an intersection of the slice with the neutral axis of the color-conversion cube and (2) a plurality of grid points on a plurality of faces of the color conversion cube (i.e. on the edge of the slice). In addition, the at least one neutral-axis cross-sectional slice is orthogonal to the neutral axis.

The method according to the second embodiment includes identifying a straight line connecting the intersection with a point on one of the faces of the color-conversion cube, where the straight line also passes through an interior grid point. A first output corresponding to the intersection and a second output corresponding to the point on one of the faces of the color conversion cube are both determined. The first output is based on a first design rule, while the second output is based on a second design rule. A third output corresponding to the interior grid point is also derived, where the third output is based on a third design rule. The third design rule may, for example, be a blend between the first design rule and the second design rule. The blend is determined by calculating a distance, for example. The first, second, and third outputs are stored in the look-up table.

These as well as other aspects and advantages will become apparent to those of ordinary skill in the art by reading the following detailed description with reference where appropriate to the accompanying drawings.

BRIEF DESCRIPTION OF THE DRAWINGS

FIG. 7A is a simplified conceptual block diagram illustrating a NAX slice, in (slice 7) accordance with one embodiment.

FIG. 9 is a flow diagram illustrating a method for creating a run-time color-conversion LUT in accordance with one embodiment.

FIG. 10 is a flow diagram illustrating a method for creating a three-dimensional color-conversion LUT, in accordance with one embodiment.

FIG. 12 is a simplified conceptual block diagram illustrating the correlation, on a NAX slice, between the neutral axis, faces, and the neutral-axis intersection in accordance with one embodiment.

FIG. 13 is a flow diagram illustrating a method for creating a 3D LUT using a design tool, in accordance with one embodiment.

FIGS. 15-23 are example screenshots for the design tool shown in FIG. 14.

DETAILED DESCRIPTION OF THE DRAWINGS

Embodiments of the present invention assist in creating a run-time LUT for color conversion. FIGS. 1-4 illustrate a typical print controller arrangement and 3D LUT configuration for use in performing color conversion for a color printer. FIGS. 3-13 set forth, in detail, embodiments for utilizing a neutral-axis cross-section (NAX) technique to create one or more run-time color-conversion 3D LUTs based on desired design goals.

Figure 1:
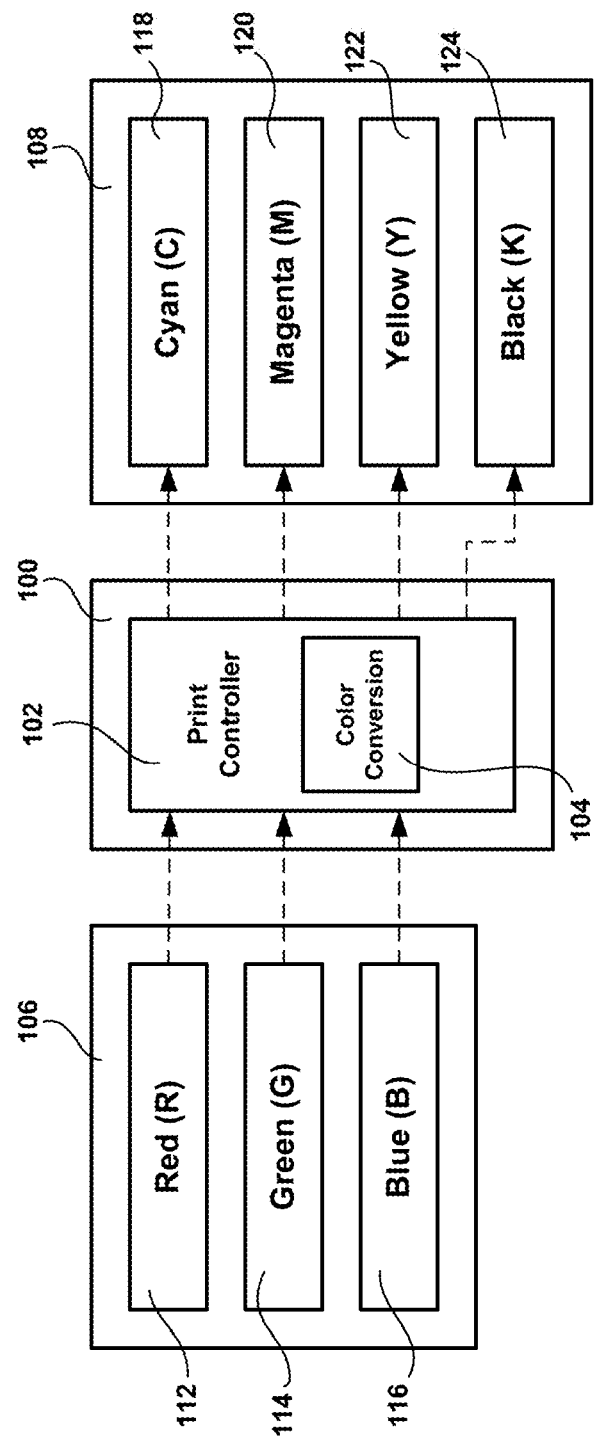
FIG. 1 is a simplified functional block diagram illustrating color conversion in an image forming device.

FIG. 1 is a simplified functional block diagram illustrating color conversion in an image forming device 100, such as a color printer. The image forming device 100 includes a print controller 102 with an RGB-to-CMYK converting unit 104 to execute a color conversion process. The color conversion process may, for example, convert from a first color gamut 106 associated with a first device, such as a computer monitor, to a second color gamut 108 associated with a second device, such as the image forming device. Specifically, RGB-to-CMYK converting unit 104 references one or more color conversion LUTs (see, e.g., FIG. 2) in which the relationship between the RGB values and the CMYK values is expressed at regular or irregular intervals as a grid to convert an image composed of RGB components into an image (color-converted image) composed of CMYK components.

In this example, the first color gamut 106 is specified by combinations of red (R) 112, green (G) 114, and blue (B) 116, while the second color gamut is specified by combinations of Cyan (C) 118, Magenta (M) 120, and Yellow (Y) 122. A black (K) colorant 124 may also be included, to assist in reproducing certain blacks and/or to reduce color toner or ink usage, for example. The first and second color gamuts 106 and 108 are typically device-dependent (e.g. the second color gamut depends on factors such as ink or toner characteristics, paper-type, etc.). Therefore, transformation to and from a device-independent color space, such as the CIELAB space may be performed as an intermediate step. This intermediate transformation and reverse transformation is understood to be included in certain embodiments described herein, as appropriate.

In order to provide a single LUT that includes every possible input for a three-component RGB gamut 106 where each R, G, and B input has 8 bits, a 3D LUT having a size 256×256×256 (16,777,216 grid points) would be required. A four-component CMYK output system would require four such 3D LUTs (i.e. one for each of C, M, Y, and K). This size LUT is currently impractical for typical efficient and cost-effective print controllers.

Instead, in order to maintain efficient, cost-effective operation, a 3D LUT having "sparse" grid points may be utilized. For example, instead of a 256×256×256 LUT, a 17×17×17 LUT may be used to find the output. Instead of almost 17 million grid points for a 256×256×256 LUT, the 17×17×17 LUT has under 5,000 grid points. Each grid point in the 3D LUT corresponds to an RGB index (R, G, and B) that contains a CMYK output corresponding to the RGB inputs. If a particular input (R, G, B) is not on one of the sparse grid points, the print controller (or other module) uses 3D interpolation to find the output (C, M, Y, K). Such interpolation may include tetrahedral interpolation, for example.

Figure 2:
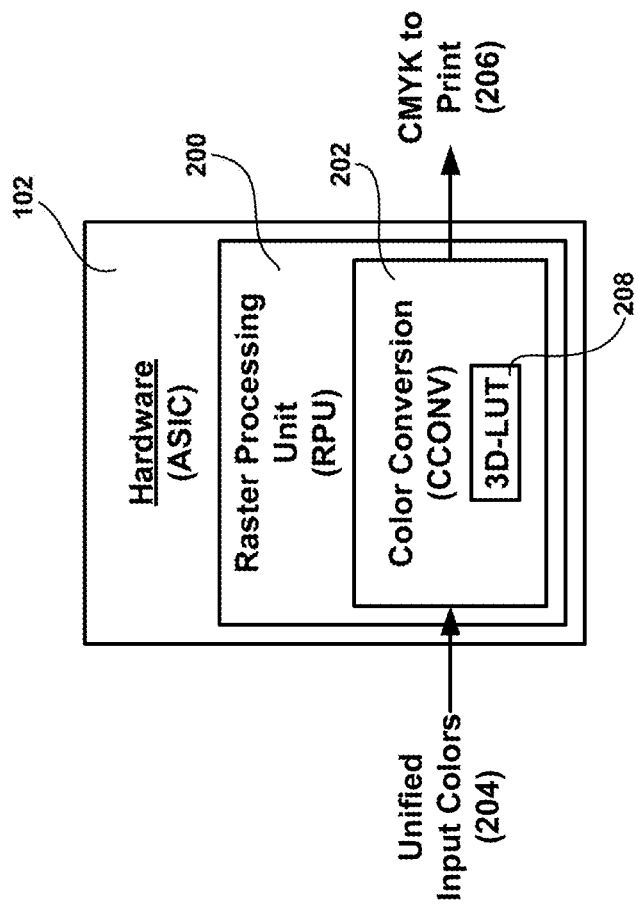
FIG. 2 is a simplified functional block diagram illustrating color conversion functions in a print controller of an image forming device.

FIG. 2 is a simplified functional block diagram illustrating the print controller 102 shown in FIG. 1. The print controller 102 is preferably comprised of hardware (e.g. an Application-Specific Integrated Circuit (ASIC)) including a Raster Processing Unit (RPU) 200 that converts color from certain color input sources to CMYK. The RPU 200 includes a Color Conversion (CCONV) module 202 to implement color conversion using one or more 3D LUTs 208. The 3D LUTs are preferably stored in a non-volatile data storage, such as in a Read-Only Memory (ROM), for example. The CCONV module 202 converts input colors 204 (e.g. unified by firmware) to CMYK colors 206 for use in printing.

Figure 3:
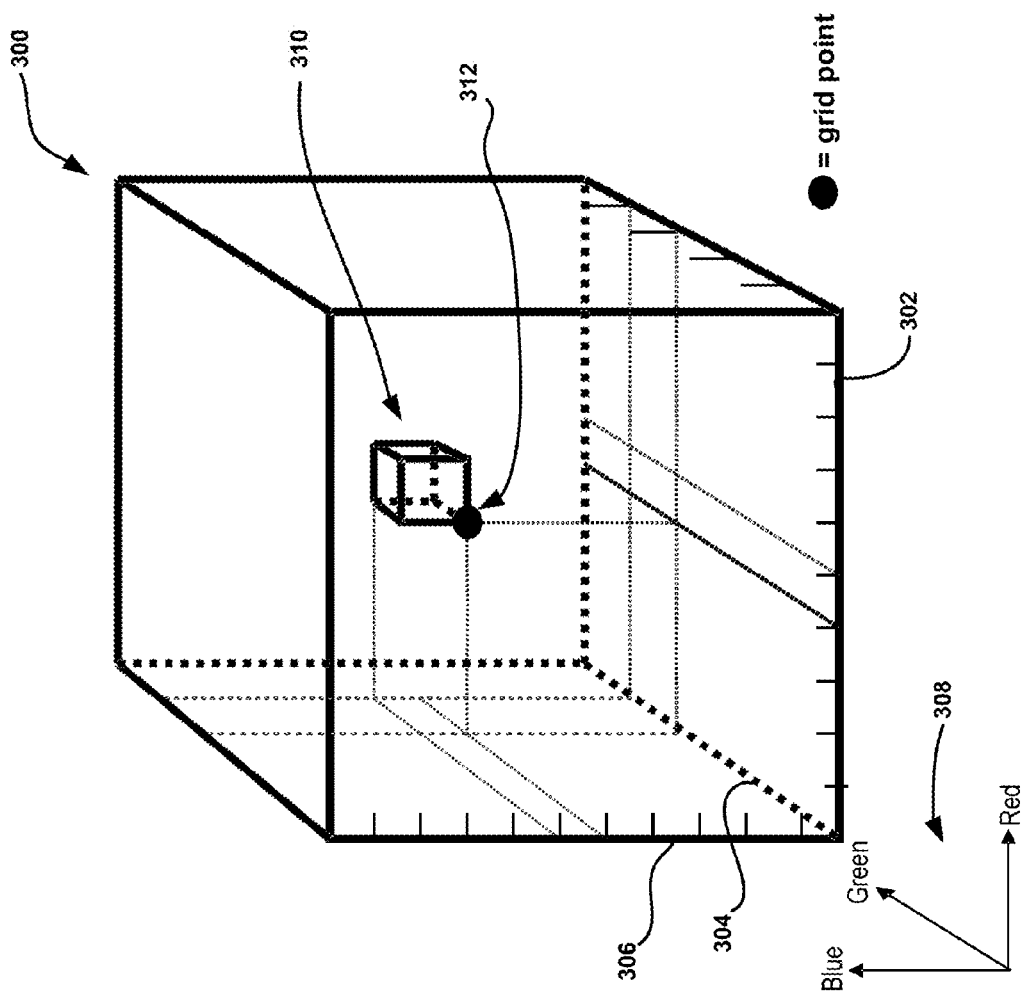
FIG. 3 is a simplified block diagram illustrating a 3D color conversion cube LUT with 3D interpolation, in accordance with various embodiments described herein.

FIG. 3 is a simplified block diagram illustrating a 3D LUT color conversion cube 300, in accordance with various embodiments described herein. The color conversion cube 300 includes a color coordinate system comprising a red axis 302, a green axis 304, and a blue axis 306, each originating at a common vertex of the cube 300 and spanning toward additional respective R, G, and B vertices. This coordinate system 308 allows a three-component (R, G, B) input to be tied to a grid point 312 inside the 3D LUT. This grid point 312 contains the corresponding CMYK output. If a particular three-component (R, G, B) input is not located on a grid point, then interpolation may be used to determine the output. Suitable interpolation methods are based on the Euclidean distance from the particular input to the nearest grid points. As illustrated, the interpolation uses an interpolation subcube 310 framed by eight nearest grid points. Inputs located within this interpolation subcube 310 may have output values related to these eight grid points (and possibly other neighboring grid points), according to one embodiment. Trilinear interpolation uses the outputs of all eight nearest grid points to compute the output, while tetrahedral interpolation selectively uses four grid points.

Figure 4:
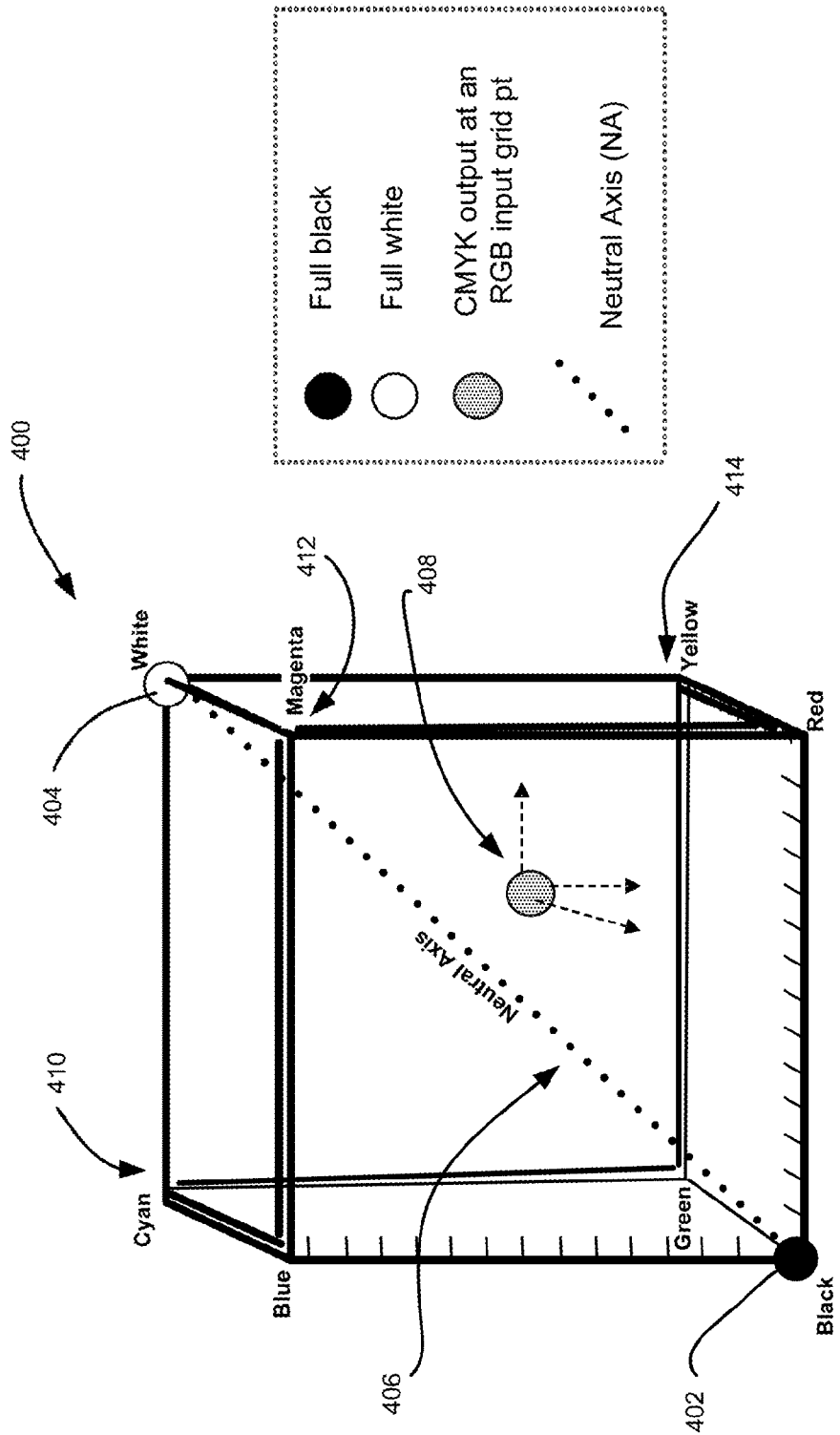
FIG. 4 is a simplified block diagram illustrating additional components of a 3D color conversion cube LUT, in accordance with various embodiments described herein.

FIG. 4 is a simplified block diagram illustrating additional components of a 3D LUT color conversion cube 400, in accordance with various embodiments described herein. The cube 400 utilizes the same R, G, B coordinate system as the cube 300, but the illustration of cube 400 also shows a "full black" vertex 402 and a "full white" vertex 404, corresponding respectively to white (no colorant) and black (full colorant). A neutral axis 406 spans the diagonal between the full black vertex 402 and the full white vertex 404. The neutral axis 406 represents a continuous gray gradient ranging from black (dark gray near the full black vertex 402) all the way to white (light gray near the full white vertex 404). The neutral axis 406 may also be referred to as the neutral gray axis.

Also shown in FIG. 4 are vertices corresponding to Cyan (C) 410, Magenta (M) 412, and Yellow (Y) 414. The edges separating the RGB faces from the CMY faces (as bounded by their respective vertices and edges) are shown in double-lined form in FIG. 4. The cube 400, like cube 300, is a conceptual model of a 3D LUT, in which an RGB input grid point 408 corresponds to a CMYK output. Note that the RGB and CMY axes may be scaled differently, depending on what values are used to represent minimums and maximums in the corresponding color gamuts. In addition, while the cube 400 may be useful for conceptualizing a 3D LUT, the physical implementation of a 3D LUT might not be stored as such in actuality. Instead, the 3D LUT will likely be implemented as a mapped array (sequential or otherwise) of memory locations corresponding to each of the grid points represented in the cube 400. In the case of a CMYK output, there would typically be four memory locations (of appropriate bit-length) corresponding to each grid point. Each of the four memory locations corresponds respectively to a C, M, Y, or K output value.

For ideal color mappings, the CMYK outputs would be exact colorimetric matches to inputs. In other words, the color mapping would be a fundamental color reproduction, verifiable using a commercially available spectrophotometric and colorimetric instrument. As a more advanced goal, color mappings to exact color appearance (as perceived by the human eye), may be attempted.

However, due to mismatches in the color gamuts between input and output devices, ideal mappings are typically not possible for all colors. Therefore, designers of color conversion LUTs instead settle for graceful manipulation of mappings between input and output colors. In addition, the designers should ensure that the run-time color-conversion LUT used by the Raster Image Processing (RIP) unit properly captures all the manipulated color mappings while also preserving smooth transitions.

Thus, aside from generally mapping a significant number of 3D grid points (e.g. colorimetric match), a designer of a color LUT will typically have three goals: (1) implementing special properties in the printer CMYK values for colors on the input gamut boundary, i.e. the six faces bounding the 3D LUT (color conversion cube) 400; (2) specifying an exact composition of the printer CMYK values, corresponding to the amount of K colorant used, for colors on the input neutral axis; and (3) determining outputs of interior grid points between the input gamut boundary and the input neutral axis. These three goals are examples of design rule bases that may be utilized in accordance with embodiments of the present invention.

FIGS. 5-8 and 11-23 illustrate a design environment that may be used to create run-time 3D LUTs in accordance with embodiments of the present invention. The neutral-axis cross-section technique addresses practical design goals (such as the goals listed in the preceding paragraph) in a convenient environment to allow the designer (and/or a device or system) to unambiguously determine the nature of the color mapping of each grid point in a 3D LUT color conversion cube, such as the color conversion cube 400, for example.

Figure 5:
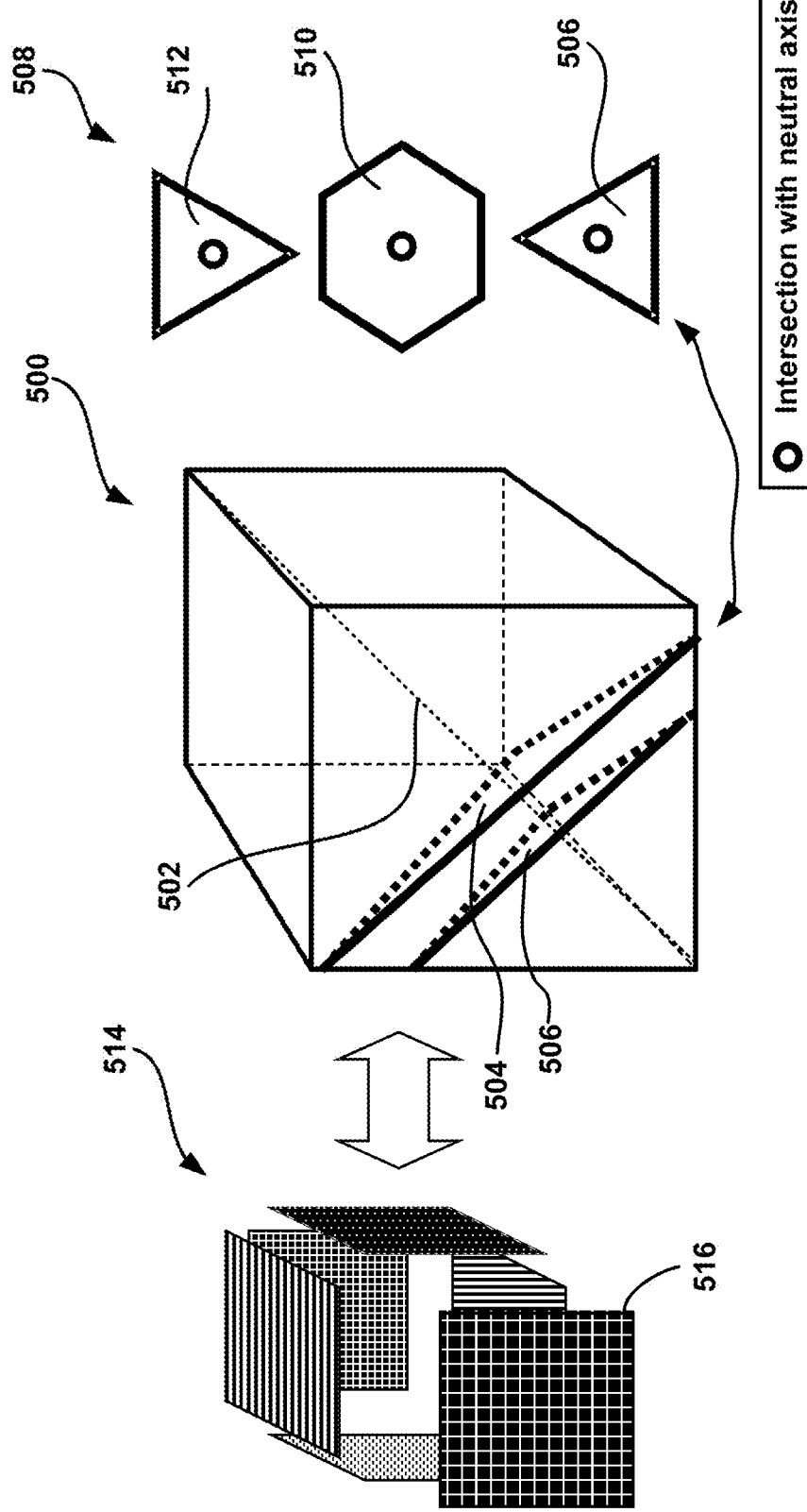
FIG. 5 is a conceptual block diagram illustrating a 3D LUT color conversion cube, from which neutral-axis cross-section (NAX) slices are derived.

FIG. 5 is a conceptual block diagram illustrating a 3D LUT color conversion cube 500, from which neutral-axis cross-sections 508 are derived. The cube 500, like cube 400, includes a neutral axis 502 spanning from a first vertex (e.g. a full black vertex) to a second opposite vertex (e.g. a full white vertex). Along this neutral axis 502, a plurality of slices (e.g. slices 504 and 506) can be defined as being a plurality of planar sections that are orthogonal to the neutral axis 502. Each planar section (slice) is bound by three or six faces of the cube, depending on the position of the slice along the neutral axis 502. Slices nearer the full black and full white vertices of the cube 500 are triangular (see triangular slices 506 and 512), while those near the midpoint of the neutral axis 502 are hexagonal (see hexagonal slice 504), due to the increased number of faces that will serve as slice edges near the middle portion of the neutral axis. These NAX (Neutral Axis) cross-sectional slices each intersect the neutral axis 502 at their respective geometric centers.

Figure 6:
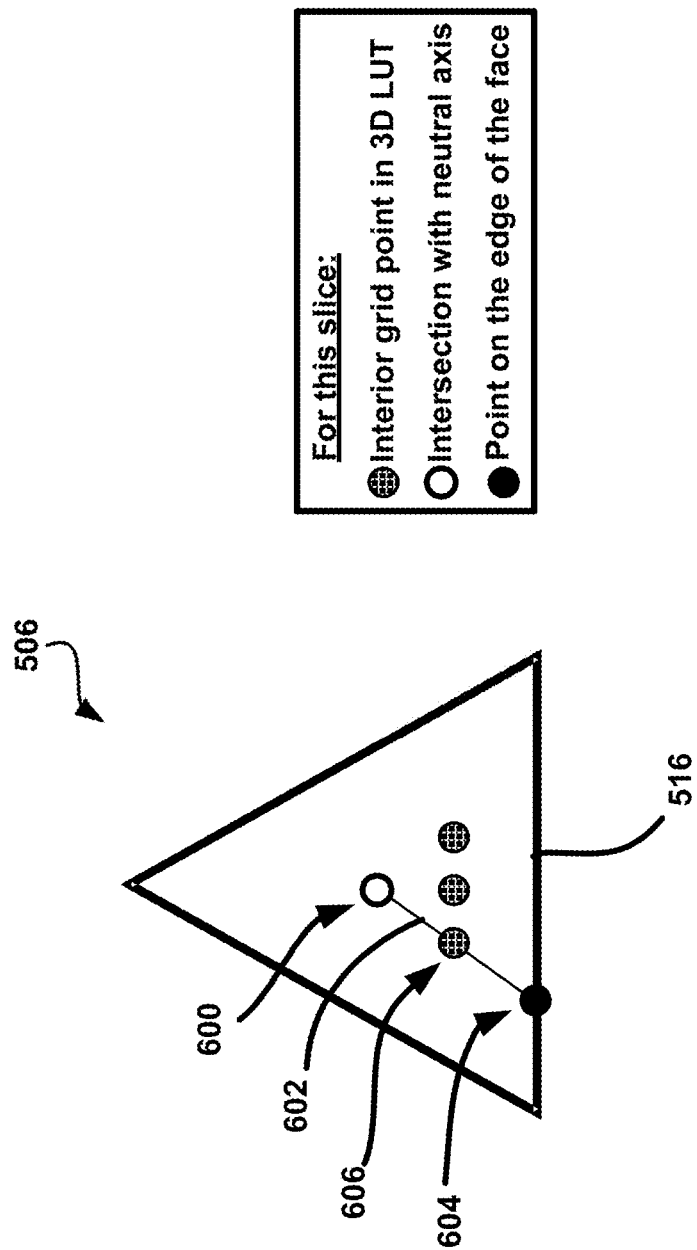
FIG. 6 is a simplified conceptual block diagram illustrating a NAX slice, in accordance with one embodiment.

The NAX slices 508 provide advantages to a designer of run-time 3D LUTs, as will be outlined below. These advantages are at least partially due to the geometric symmetries afforded by the NAX slices. For example, as shown in FIGS. 5 and 6, for a finite-sized 3D LUT color conversion cube (such as cube 500), each NAX slice (in this example, triangular slice 506) has an intersection 600 with the neutral axis 502 (although not always on a grid point, due to the relative differences in length between the color axes (cube edges) and the neutral axis (cube diagonal)). These intersections 600 with the neutral axis 502 can all be connected with straight lines 602 to respective grid points 604 on the faces 514 of the color conversion cube 500. In addition, the interior grid points 606 of the cube 500 (i.e. those between the neutral axis 502 and the cube's faces 516) are all on respective straight lines (in a NAX plane) that can be drawn to connect the neutral-axis intersection 600 with a corresponding well-defined point 604 (not necessarily a grid point) on the face of the 3D LUT color conversion cube 500. In the example shown in FIG. 6, the neutral-axis intersection 600 is connected via straight line 602 through an interior grid point 606 to a point 604 on the face 516.

FIG. 7A is a simplified conceptual block diagram illustrating a NAX slice 700, in accordance with one embodiment. The NAX slice 700 is similar to the NAX slice 506, except additional face grid points and interior grid points are illustrated, to help demonstrate the NAX LUT-creation method. In FIG. 7A, the neutral-axis intersection 702 is shown as a hollow circle at the center of the slice 700, a plurality of grid points on the color-cube faces are shown as filled circles (see, e.g., grid point 704), and a plurality of interior grid points are shown as circles having cross-hatching (see, e.g., grid point 706). The NAX slice 700 corresponds to slice 7 shown in FIG. 11g.

Figure 7B:
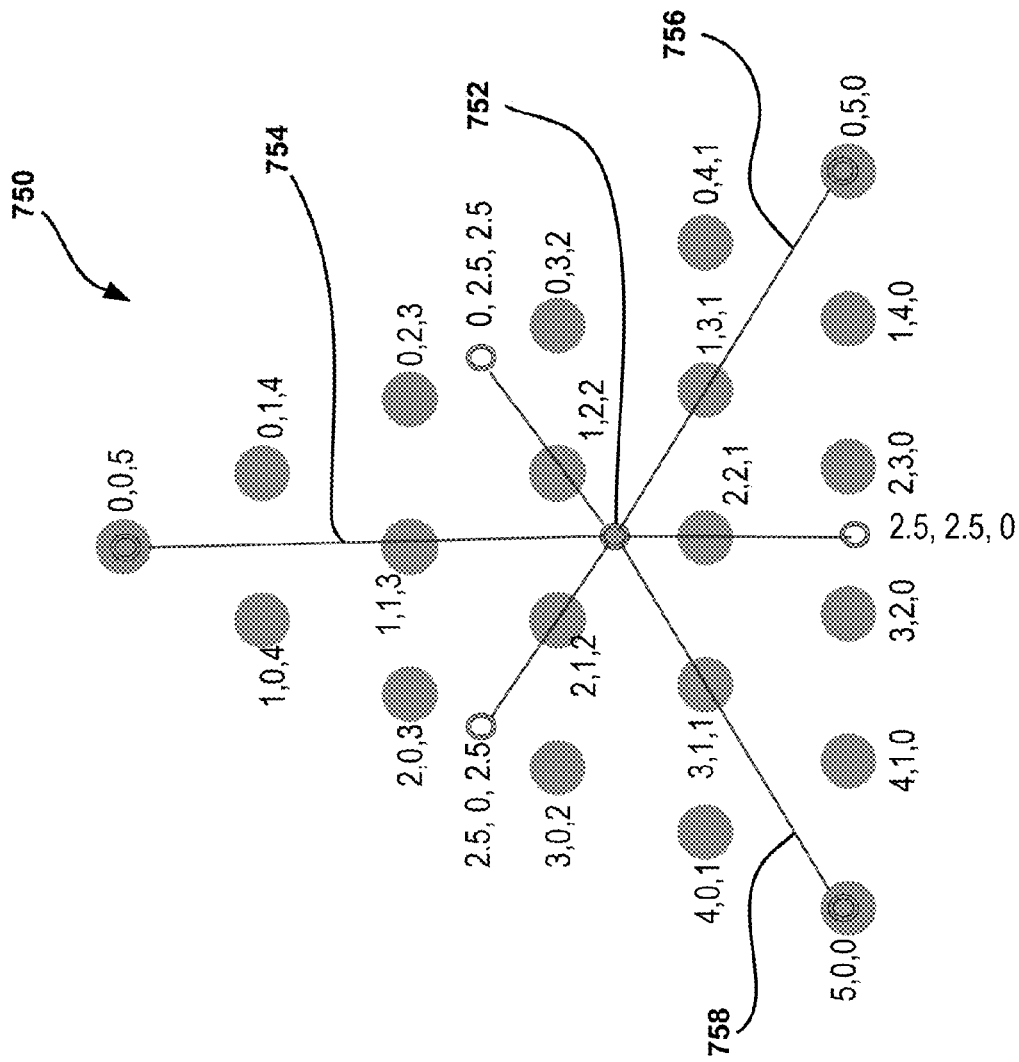
FIG. 7B is a simplified conceptual block diagram illustrating another NAX slice (slice 6), in accordance with one embodiment.

Similarly, FIG. 7B is a simplified conceptual block diagram illustrating another NAX slice 750. The NAX slice 750 is similar to the NAX slice 700, except that the neutral axis does not intersect the NAX slice 750 at a grid point. Instead, the neutral axis intersects the NAX slice 750 at a well-defined point 752 on the NAX plane that is not a grid point. In the example shown, the neutral axis intersects the NAX slice 750 at (R, G, B)=(1.67, 1.67, 1.67). As shown the grid points of the NAX slice 750 range from (R, G, B)=(0, 0, 5) at a first vertex to (R, G, B)=(5, 0, 0) at a second vertex to (R, G, B)=(0, 5, 0) at a third vertex. Also as shown, straight lines 754, 756, and 758 that connect the neutral-axis intersection with interior grid points intersect the faces of the NAX slice 750 at well-defined points. In the example shown, these well-defined points are at (2.5, 0, 2.5), (2.5, 2.5, 0), and (0, 2.5, 2.5). The NAX slice 750 corresponds to slice 6 shown in FIG. 11f.

With reference again to FIG. 7A, a designer or device using the NAX slice 700 (and other parallel NAX slices along the neutral axis) to create a run-time 3D LUT for color mapping may first set up the source-to-destination color mapping for the neutral axis grid points (e.g. intersection 702) and the face grid points (e.g. 704) or other well-defined point. In accordance with one or more design goals, this may entail (1) using only K colorants for output on the neutral axis grid points (e.g. to save color ink or toner and/or to provide a better colorimetric match) and (2) trading color accuracy for vivid printer CMYK output (i.e. mapping according to a subjective preference (preferred colors) versus exact colorimetric matching). As further examples, for photographic images, a design goal may include ensuring that the neutral axis grid points are always a blend of CMYK (rather than only K colorants). Similarly, a design goal may include varying the gamut mapping on the face grid points between colorimetric matches and preferences, depending on the particular user application. Other design goals may additionally or alternatively be implemented using the NAX slice 700, such as design goals that pertain to interior points (between the neutral axis grid points and the face grid points). Design goals pertaining to the interior grid points may include varying treatment depending on the distance of the interior grid points to the neutral axis and/or face grid points, for example. These design goals are examples of bases for design rules that may be applied to certain grid points, per the discussion above, in accordance with various embodiments.

Once at least first and second design rules have been applied to map the neutral axis intersection (e.g. grid point 702 or other well-defined point) and the face points (e.g. grid point 704), the color mapping of each interior grid point can proceed by reference to the straight connecting line between the neutral axis intersection and the face points. The transition from the nature of the neutral-axis color mapping to that of the face color mapping is preferably seamless across a NAX slice, and may, for example, be conducted according to a third design rule. For example, interior grid points nearest the neutral-axis intersection may more closely resemble the colorant-only colorimetric mapping (more significant K influence) of the neutral-axis intersection. Conversely, interior grid points nearest the cube faces (slice boundaries) may more closely resemble the "snap-to-printer-primaries" approach used for the face points. With the same third design rule applied across NAX slices to the neutral axis, cube faces, and interior point transitions (i.e. inter-slice, rather than intra-slice), the slice-to-slice output colors will also exhibit smooth variations.

Figure 8:
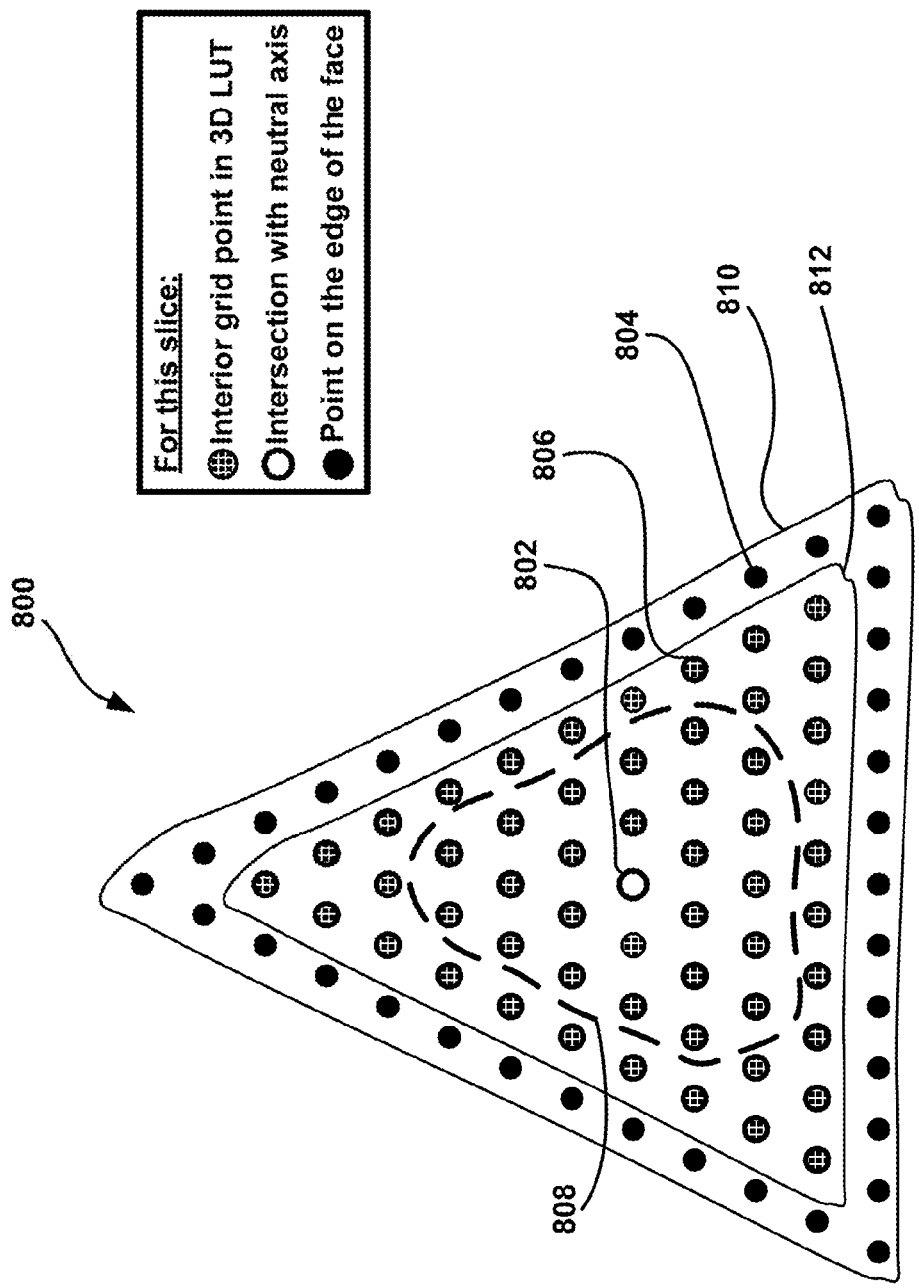
FIG. 8 is a simplified conceptual block diagram illustrating another NAX slice, for which an example design application is described.

FIG. 8 is a simplified conceptual block diagram illustrating another NAX slice 800, for which an example design application will be described. The NAX slice 800 includes a neutral-axis intersection 802, grid points on the color-cube faces (e.g. grid point 804), and interior grid points (e.g. grid point 806). As illustrated, a first region (shown bounded by dashed line 808) consists of a selection of interior points relatively closer to the neutral-axis intersection 802. For the design rules set forth above with reference to FIG. 7A, the interior grid points in the first region generally follow (perhaps to varying extent) the colorimetric reproduction that favors the K colorant, according to the first design rule. Recall that the neutral-axis intersection 802 preferably has a colorimetric reproduction using only K colorant. Conversely, the grid points on the face (i.e. those points between solid lines 810 and 812) are subjectively mapped to saturated printer device colors, per the second design rule described above with reference to FIG. 7A. Finally, the interior grid points in a second region between the dashed line 808 and the solid line 810 are subjected to a smooth transition (e.g. a blend), preferably in accordance with a third design rule. Note that the lines 808, 810, and 812 are for illustrative purposes only and show one arbitrary possibility for applying the design rules to the grid points. Other groupings and design rule applications may alternatively be used.

The transition specified by the third design rule may, for example, be a blend between the design rules for the grid points on the color-cube face and for the grid points near the neutral-axis intersection and may be made according to a number of different options. A first option is to gauge an interior grid point's "distance" along the connecting straight line from the neutral-axis intersection and/or from the grid point on the face. The distance is according to the designer's particular goals, and may be, for example, a distance in source color code values. This is likely to be the most direct gauge of a transition. An alternative distance that could be used is the colorimetric difference in terms of the source color code values between (1) the particular interior point and the neutral-axis intersection, and (2) the particular interior point and the grid point on the face. Other alternatives may also be used to assist in color mapping for the interior grid points.

Utilizing various embodiments of the design environment described above to create run-time 3D LUTs allows practical design goals to be addressed. FIGS. 9 and 10 set forth methods for creating run-time color-conversion look-up tables using such an environment.

FIG. 9 is a flow diagram illustrating a method 900 for creating a run-time color-conversion LUT, in accordance with one embodiment.

In block 902, a conceptual representation of a neutral-axis slice of a color conversion object, such as a 3D LUT color conversion cube, is presented to a user. For example, a graphical representation of a slice, such as the slice 800 shown in FIG. 8, could be displayed on computer monitor or other output device to allow a user to interact with the slice using a mouse and/or other input device. The color conversion object is defined by a color coordinate system having a plurality of color axes, such as R, G, and B axes. In addition, the color conversion object also includes a neutral axis (e.g. a K colorant axis). Each color axis preferably includes values ranging from a respective minimum value to a respective maximum value, while the neutral axis includes values ranging from a minimum colorant amount to a maximum colorant amount. The slice is defined by a plurality of grid points on the color coordinate system that are in a common plane orthogonal the neutral axis. In addition, the slice is bound along a plurality of faces of the color conversion object for which at least one of the plurality of color axes (i.e. inputs) is at a minimum or maximum value.

In block 904, a user input is received that includes a parameter for a first design rule. The first design rule, for example, may be applied to any grid point at an intersection of the slice with the neutral axis.

In block 906, a user input is received that includes a parameter for a second design rule. The second design rule, for example, may be applied to outputs at grid points located on at least one of the faces of the color conversion object.

In block 908, outputs for interior grid points located between the intersection and the faces are determined, preferably in accordance with a third design rule. This may include, for example, calculating a transition (or blend) between the first design rule and the second design rule, such as by using the distance concept, as discussed above with reference to FIG. 8. The third design rule may alternatively include some other technique for transitioning between grid points at the neutral axis intersection and grid points at the face. This third design rule may be received as a user input (e.g. through a user selection or specification) or may be an internally programmed design rule, for example.

In block 910, the outputs for the slice are stored in a portion of the look-up table. Conventional memory-write techniques may be used, for example.

The method 900 is preferably performed for all grid points in the slice, and for all slices in the color conversion object.

The blocks 902-910 may be performed in a different order from that illustrated in FIG. 9. In addition, in some embodiments, one or more of the blocks 902-910 may be omitted to further facilitate automated 3D LUT design. Additional blocks may also be introduced.

FIG. 10 is a flow diagram illustrating a method 1000 for creating a three-dimensional color-conversion LUT, in accordance with another embodiment.

In block 1002, at least a portion of a NAX slice of a color-conversion cube is displayed. The color conversion cube (e.g. cube 400) provides a conceptual model for converting from a first color space associated with a first device, such as a monitor, to a second color space associated with a second device, such as a printer. The at least one NAX slice has a plurality of co-planar grid points located thereon (see, e.g., FIG. 8), including a plurality of interior grid points (e.g. grid point 806) located between an intersection with a neutral axis of the color-conversion cube and a plurality of points on the faces of the color conversion cube (i.e. on the edges of the NAX slice). In addition, the at least one NAX slice is orthogonal to the neutral axis.

In block 1004, a straight line connecting the intersection with a grid point on one of the faces of the color conversion cube is identified. The straight line also passes through an interior grid point in this embodiment, due to the regular geometry of the slice.

In block 1006, a first output corresponding to the intersection is determined, based on a first design rule.

In block 1008, a second output corresponding to the grid point on the one of the faces of the color conversion cube is determined, based on a second design rule.

In block 1010, a third output corresponding to the interior grid point is determined. The third output may be based on a third design rule. One example of the third design rule is a blend between the first design rule and the second design rule. For example, the third design rule may include calculating a distance, as was described with reference to FIG. 8.

In block 1012, the first, second, and third outputs are stored in the look-up table.

The method 1000 is preferably performed for all grid points in the slice, and for all slices in the color-conversion cube.

The blocks 1002-1012 may be performed in a different order from that illustrated in FIG. 10. In addition, in some embodiments, one or more of the blocks 1002-1012 may be omitted to further facilitate automated 3D LUT design. Additional blocks may also be introduced.

Figure 11Q:
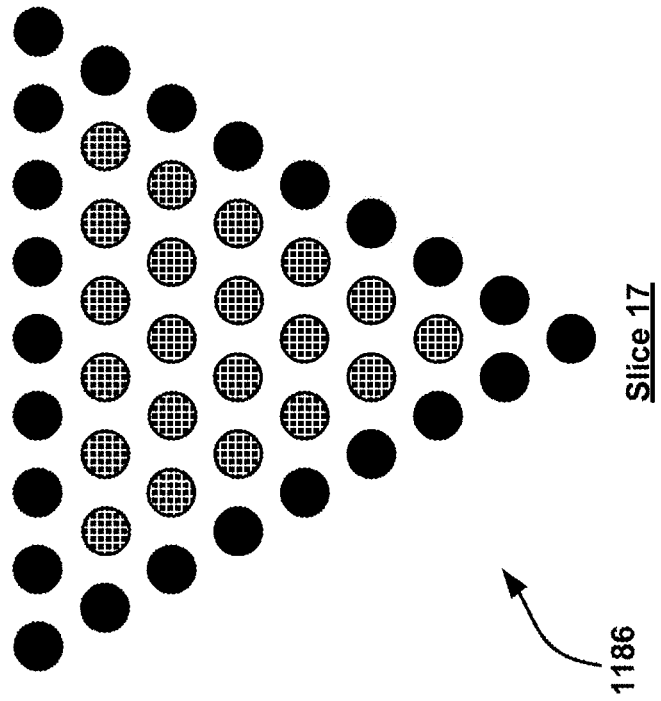
FIGS. 11a-y are simplified conceptual block diagrams illustrating all 25 NAX slices in a 9×9×9 conversion cube, in accordance with one embodiment.
Figure 11P:
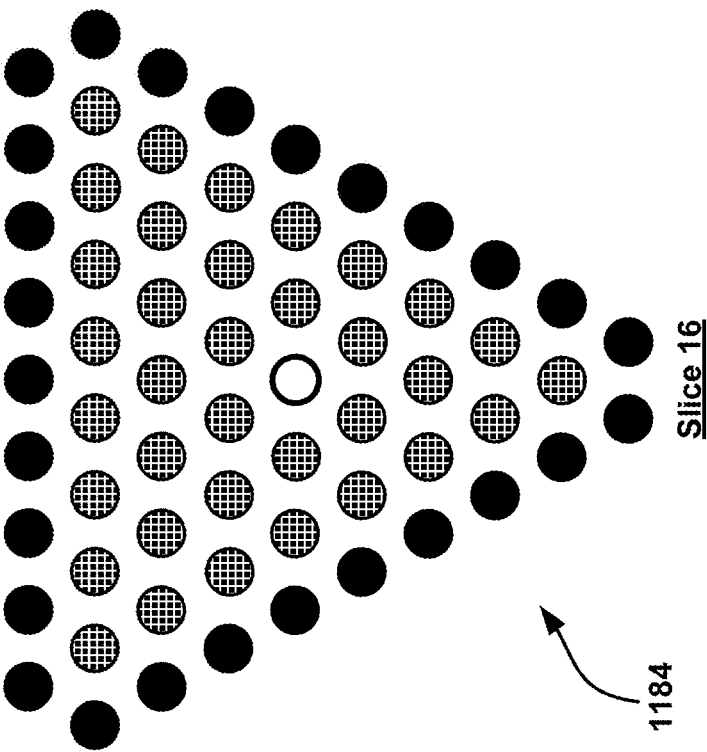
Figure 11V:
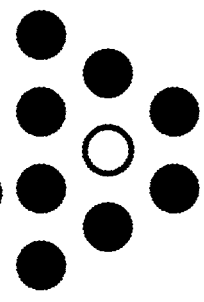
Figure 11W:
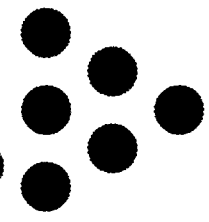
Figure 11X:
Figure 11Y:

FIGS. 11*a-y* are simplified conceptual block diagrams illustrating all 25 NAX slices created by a 9×9×9 unit 3D LUT color conversion cube, in accordance with one embodiment. Each NAX slice (see, e.g., 1100) is functionally similar to NAX slice 700 and NAX slice 506, except FIGS. 11*a-y* illustrate every slice that would be created.

As illustrated in FIG. 11*a*, a first slice 1100 includes a point 1102 that would be located on either end of the neutral axis line, thus located at either the relative maximum or minimum K colorant application. The single point 1102 would be located at the intersection of the neutral axis and the corner of a color conversion cube (see, e.g., color conversion cube 500). Conversely, FIG. 11*y*, which is the twenty-fifth slice 11102, is located at the intersection of the neutral axis and the corner of the color conversion cube opposite the first slice 1100. Slice 11102 would be the opposite amount of colorant used in slice 1100. For example, if slice 1100 is a first amount of colorant (e.g. the respective maximum amount of K colorant (e.g. a "full black" vertex 402)), then slice 11102 would be a second amount of colorant (e.g. the respective minimum amount of K colorant (e.g. a "full white" vertex 404)).

FIG. 11*b* is a conceptual block diagram of NAX slice 1104 showing the second slice that would be created according to the present example. Each of the three points 1106 on the NAX slice 1104 is a grid point located on a color cube face. Similarly, FIG. 11*c* shows the third slice 1108 created with a plurality (six) of grid points 1110 located on the faces of the color conversion cube.

FIG. 11*d* illustrates the fourth NAX slice 1112 with a plurality (nine) of points 1114 along the edges of the color conversion cube and intersecting the neutral axis at point 1116. FIG. 11*e* illustrates the fifth slice 1118 with a plurality (twelve) of points 1122 along three faces of the color conversion cube, and three interior grid points 1120. FIG. 11*f* illustrates the sixth slice 1124 with a plurality (15) of points 1128 on the faces of the color conversion cube with six interior grid points 1126. FIG. 11*g* depicts the seventh slice 1130, which intersects the neutral axis at grid point 1134, consisting of nine interior points 1132 and a plurality (18) of exterior points 1136. FIG. 11*h* shows the eighth slice created with a plurality (21) of points 1142 on the faces of the color conversion cube and a plurality (15) of interior points 1140. FIG. 11*i* illustrates the ninth slice 1144 that would be created with the plurality (24) of points 1146 on the faces of the color conversion cube and a plurality (21) of interior points 1148.

FIG. 11*j* illustrates the tenth plane 1150 orthogonal to the neutral axis, which is an irregular hexagon in the illustrated example. Slice 1150 approaches the mid-section of the neutral axis, resulting in the change from a triangular slice to a hexagonal slice. Slice 1150 has a plurality (27) of points 1154 on the faces of the cube and a plurality (35) of points 1152 on the interior of the plane. Grid point 1156 is the intersection of slice 1150 with the neutral axis.

FIG. 11k is an illustration of the eleventh slice 1158, which is also an irregular hexagon, with a plurality (27) of exterior points 1160 and a plurality (42) of interior points 1162. Likewise, FIG. 11l illustrates the twelfth slice 1164 created, with a plurality (27) of points 1168 on the face of the color conversion cube and a plurality (46) of interior grid points 1166.

FIG. 11m illustrates the NAX slice 1170 formed at the mid-point of the neutral axis, orthogonal to the axis, resulting in a regular hexagon. The plurality (24) of exterior grid points 1174 lie on the faces of the color conversion cube, surrounding a plurality (36) of interior grid points 1172. The plane intersects the neutral axis at grid point 1178.

FIG. 11n illustrates the fourteenth slice 1180 of the color conversion cube. The fourteenth slice 1180 is the reciprocal of the twelfth slice shown in FIG. 11l. Similarly, each of the remaining slices shown in FIGS. 11o-11y is the reciprocal of the slices shown in FIGS. 11a-11k (e.g. the slice in FIG. 11o is the reciprocal of the slice in FIG. 11k; the slice shown in FIG. 11p is the reciprocal of the slice in FIG. 11j).

The grid points shown in the slices of FIGS. 11a-11y are merely an example. Other embodiments may have differently spaced or orientated grid points.

In accordance with one embodiment, a designer or device may enter the desired number of units along each axis (edge) for a color conversion cube, or other 3D configuration, and the number of planar slices created can be calculated using one or more equations. Equation 6, used when the 3D LUT shape is cubical, calculates the number of orthogonal planes, in accordance with one embodiment, where N equals the number of units per side on a color conversion cube (i.e. an N×N×N cube):

Number of Slices Total (cube)=3N−2    Equation 6:

So, for the example of FIGS. 11a-11y, each side of the conversion cube has nine units, creating a total of 25 slices. The grid points for each slice are then assigned color mappings, in accordance with the design rules described above with reference to FIG. 4.

FIG. 12 is a conceptual block diagram illustrating a slice of a 3D LUT color conversion cube 1200 from which neutral-axis cross-sections are derived. The cube 1200, like the cube 500 in FIG. 5, includes a neutral axis 1204 spanning from a first vertex (e.g. a "full black" vertex) to a second opposite vertex (e.g. a "full white" vertex). Shown in FIG. 12 is a single slice 1202 that is orthogonal to the neutral axis 1204. The R, G, B coordinate system 1206 is the same as coordinate system 308 shown in FIG. 3. The coordinate system 1206 allows a multi-component input, such as RGB, to be placed inside the 3D LUT conversion cube, in accordance with one embodiment. The triangular NAX slice 1202 has a plurality of exterior grid points (e.g. 1214) along three faces of the 3D conversion cube, and a plurality of interior grid points (e.g. 1226).

In FIG. 12, the centroid of the planar NAX slice 1222 intersects the neutral-axis at (R, G, B)=(1.67, 1.67, 1.67). In FIG. 12, the three medians of the slice connect each vertex (1208, 1216, 1220) with a straight line to the midpoint of each opposite side of the triangular plane. The centroid of the slice 1222 is at the intersection of the three medians. This point 1222 is the exact point of intersection between the slice 1202 and the neutral axis 1204. Since the centroid 1222 is an undefined grid point, in this example, linear interpolation between points, or other methods, could be used to calculate the correct CMYK output for this point, in accordance with the design rules of this embodiment. The three medians in FIG. 12 further show the symmetric nature of the interior grid points 1226. The symmetrical nature assists with interpolation, in accordance with one embodiment.

FIG. 13 is a flow diagram illustrating a method 1300 for a design tool to create user desired preferences for the application of CMYK, in accordance with one embodiment.

In block 1302, a user input is received for a desired size of a 3D LUT (i.e. N×N×N). The corresponding color conversion cube provides for converting a first color space associated with a first device, such as a monitor, to a second color space associated with a second device, such as a printer. In one embodiment, the user input is a prestored or predefined value chosen only once (e.g. by a programmer). Alternatively, the user input could be entered by a user through a graphical user interface, for example.

In block 1304, the number of cross-sectional slices orthogonal to the neutral axis is calculated. Equation 6 is used in one embodiment. Blocks 1302 and/or 1304 may be performed each time or only once, such as during an initial setup or programming process. Other fundamentals, such as the number of grid points on each slice, may also be determined at this time.

In block 1306, one, some, or all of the slices are displayed to the user for color mapping. Each interior grid point (e.g. 1120), neutral axis grid point (e.g. 1116), and exterior grid point (e.g. 1106) are preferably displayed for each slice. In addition, the 3D LUT may display the face regions (e.g. 516) and the neutral axis (e.g. 1204) for the color conversion cube.

In block 1308, user inputs are received that include parameters for design rules to be applied to the grid points. The following preferences are merely examples. A first preference is for the points located on the face (e.g. 516) of a color conversion cube and edge of each NAX slice (e.g. 1122). These points may be mapped as extremely vivid, punchy, or photo-realistic, for example. A second preference stores the mapping preferences of the neutral axis (e.g. 1204). Mapping techniques for the neutral axis may include black toner (K colorant) only, CMYK blended, or mostly black toner (i.e. K) with some CMY mix. A third preference stores the characteristics desired of each interior point (e.g. 1120). Mapping techniques for interior points may include a mixture of CMYK that creates photographic, punchy, or monitor-matching colors that closely replicate a first color space associated with the first color device, in accordance with one embodiment.

One other preference is the method for blending all three types of grid points. As described in FIG. 8, there are multiple different processes for blending the grid points. A first option is to gauge an interior grid point's "distance" along the connecting straight line from the neutral-axis intersection and/or from the grid point on the face. The distance is according to the designer's particular goals, and may be, for example, a distance in source code values. An alternative distance that could be used is the colorimetric difference in terms of the source color code values between (1) the particular interior point and the neutral-axis intersection, and (2) the particular interior point and the grid point on the face. Other alternatives may also be used to assist in color mapping for the interior points.

In Block 1318, the color mapping preferences are used to determine mappings for all interior (e.g. 1120), exterior (e.g. 1110), and neutral axis (e.g. 1116) grid points. In block 1320, the mappings can be blended using the blending method chosen in block 1316. Alternatively, the blending can be part of block 1318 performed, for example, for interior grid points. Blending promotes smooth transitions across the entire NAX slice (and between adjacent NAX slices).

In Block 1322, the mapping for each grid point is stored in the LUT.

In Block 1324, the first color value, such as an RGB color, is mapped to a location in the color conversion cube. If the point is not on a pre-defined grid point (e.g. 1222) stored in the 3D LUT, the pertinent color value may be determined through interpolation, such as by calculating a distance between points, as was described with reference to FIG. 8.

The source-to-destination color mapping method 1300 provides a method to assist in meeting at least two specific design goals. First, a designer of a color 3D LUT can implement special properties in the printer CMYK values for colors on the input gamut boundary, causing the grid points to be exact color matches of the first color device or appear as extremely vivid through high CMYK concentrations. Second, a designer can specify an exact composition of the printer CMYK values, corresponding to the amount of K colorant used, for colors on the input neutral axis. Furthermore, each NAX slice (e.g. 1100) can be unambiguously blended and the color mapping can be finalized for each interior grid point. This leads to a seamless merging of interior points (e.g. 1120) on each NAX slice (e.g. 1118) to points on the face of the color conversion cube (e.g. 1122). Also, the application of uniform design rules from one NAX slice to the next promotes smooth transitions for the entire color conversion cube, in accordance with one embodiment.

FIGS. 14-23 illustrate an example of a color table construction tool 1400 that may be used to implement one or more embodiments described above. The tool 1400 allows a designer, who need not be a color science expert, to design color tables without needing to visualize and manipulate color data in multiple dimensions. Instead, the tool 1400 provides the designer with NAX slices to concisely convey the design options in an easy-to-comprehend two-dimensional domain. The three design options provided to the designer include: 1) the overall style of the majority of colors, (2) the composition of neutral grays, and (3) the treatment of the most saturated inputs. Additionally, preferences regarding the interior grid points (i.e. transition between face grid points and the neutral axis intersection) may be specified. The work of the designer may be completed, for example, after a color scientist has done background work, such as preparing different styles of mappings to account for various device-to-device limitations and color gamut mismatches.

Figure 14:
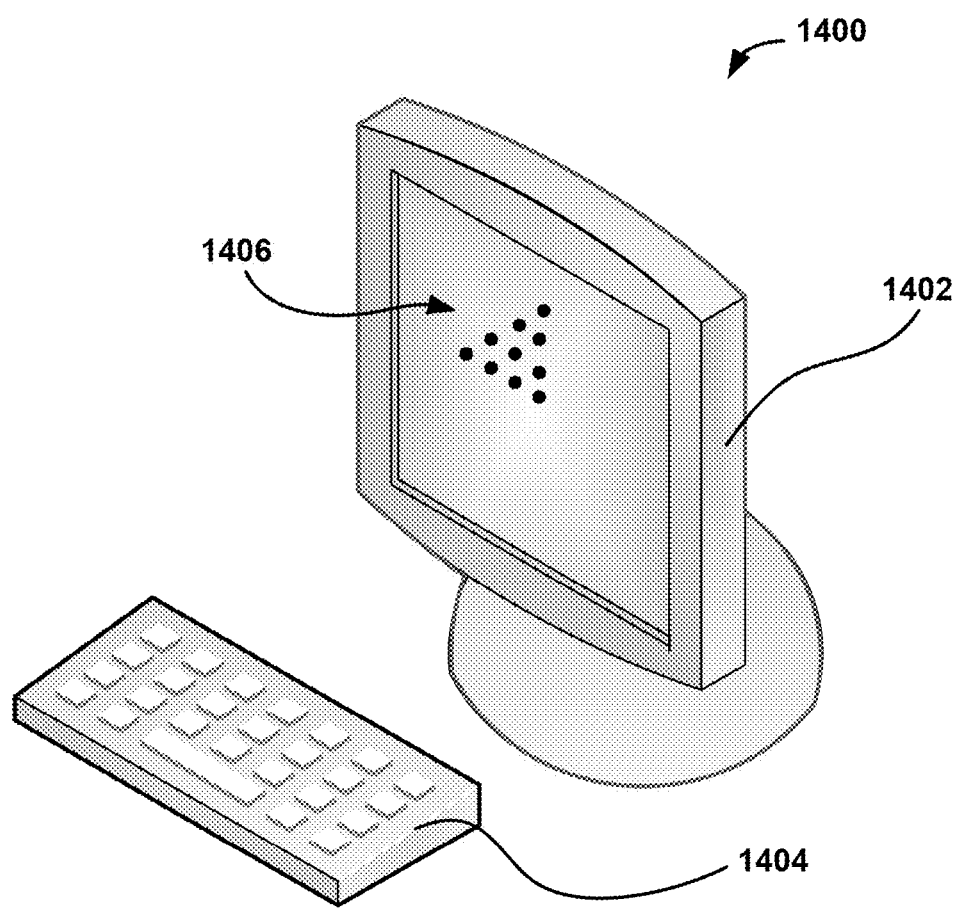
FIG. 14 is a simplified block diagram illustrating a tool for creating a 3D LUT, in accordance with one embodiment.

As shown in FIG. 14, the tool 1400 includes an output device 1402, such as a display and an input device 1404, such as a keyboard, mouse and/or trackball, for example. The output device 1402 and input device 1404 are in communication with a processor running software. For example, processor could be integrated in the same housing as the output device 1402 or the input device 1404. Alternatively, the processor running software could be located remotely, such as across a network. As yet another alternative, more than one processor could run the software. For example, the software could be a web-based application accessed through a web browser via the Internet.

The output device 1402 displays a graphical user interface (GUI) 1406 in accordance with the software run on the processor. FIGS. 15-23 illustrate example screenshots that may be displayed to a color designer (user) on the GUI 1406.

Figure 15:
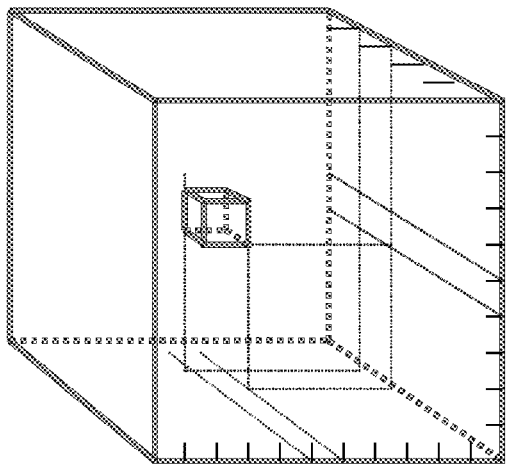

FIG. 15 illustrates a screenshot 1500 that is presented to the user so that the user can specify the size of the 3D LUT to be created. In the example shown, the user is presented with a plurality of options: two predetermined sizes (9×9×9 and 17×17×17), as well as an option to specify a custom size.

Figure 16:
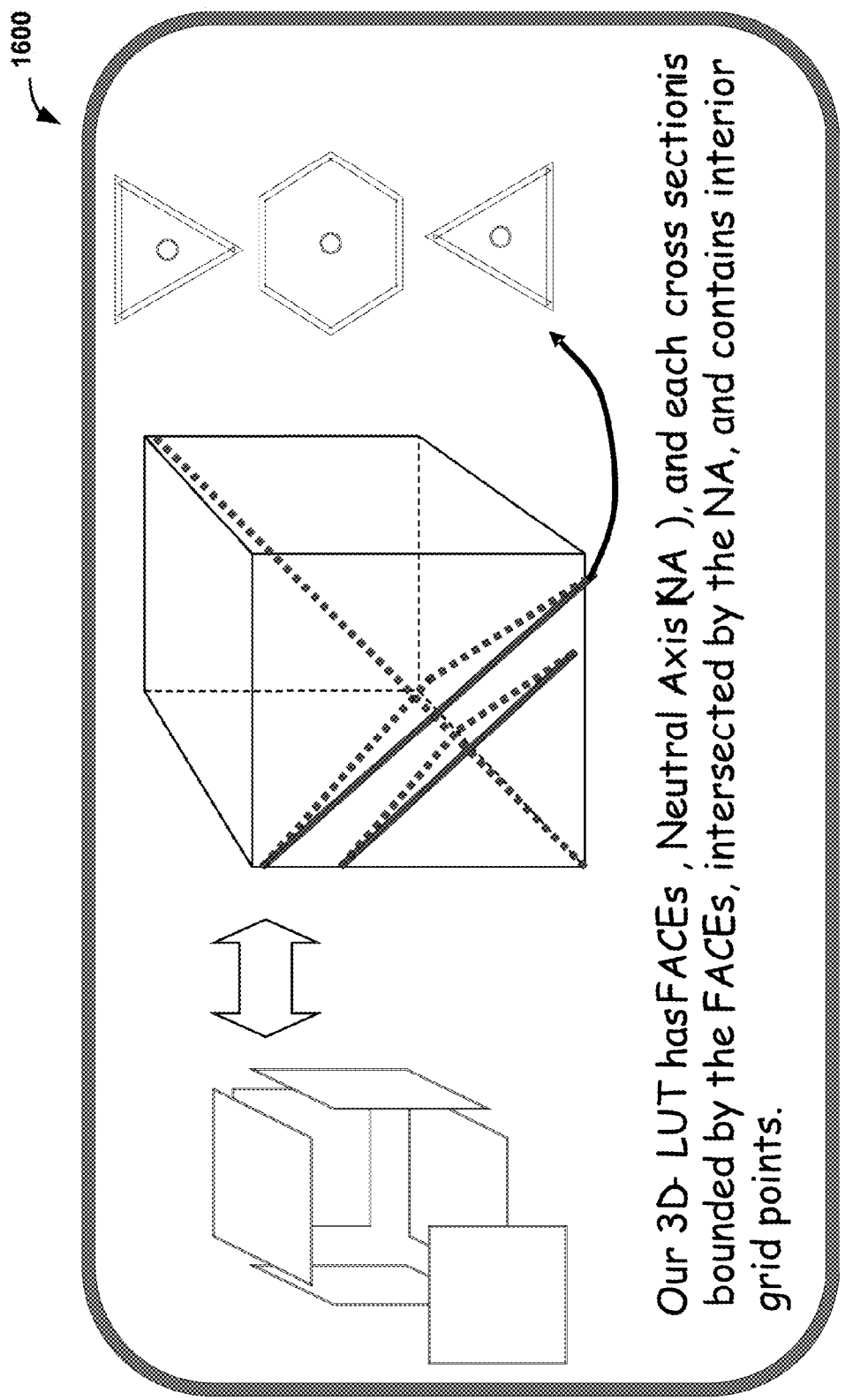
Figure 17:
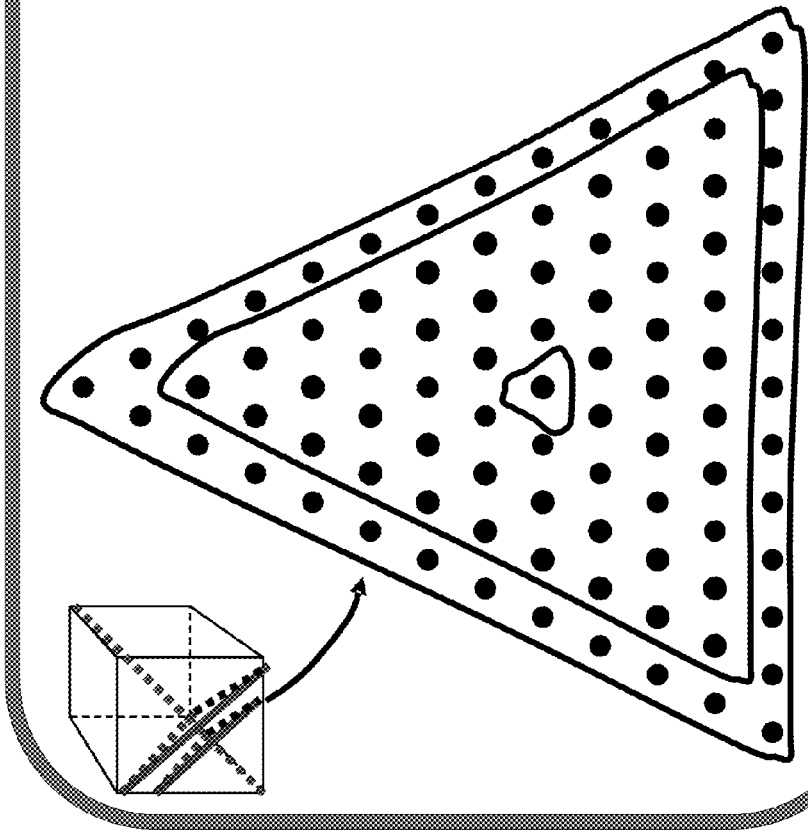

Once the size of the 3D LUT is specified, the processor running software computes the fundamental parameters of the NAX color conversion object (in this example, a cube). First, for an N×N×N 3D LUT, the 3N−2 NAX slices are identified. Within each slice, the relational information for all interior grid points is collected with respect to the neutral axis and face points. The pertinent RGB-to-CMYK mappings for each of the faces, neutral axis, and interior point regions are determined for presenting to the user. FIGS. 16 and 17 illustrate screenshots 1600 and 1700 that may be presented to the user to illustrate the regions on which the user may operate. As shown, these instructional screenshots 1600 and 1700 describe to the user the concepts of the faces, neutral axis and cross sectional slices with interior grid points, as well as color design and transitioning or blending.

Figure 18:
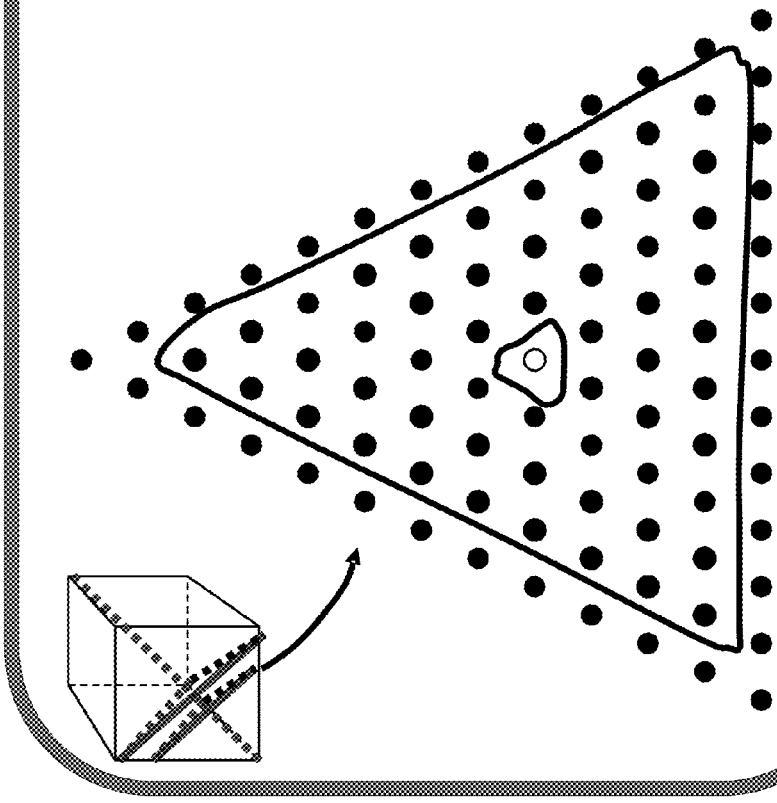
Figure 19:
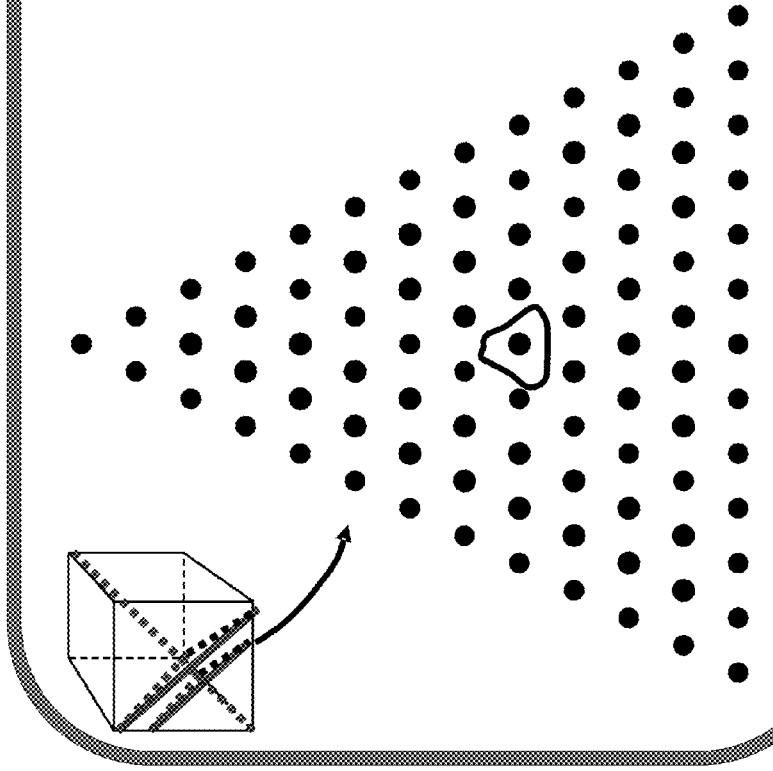
Figure 20:
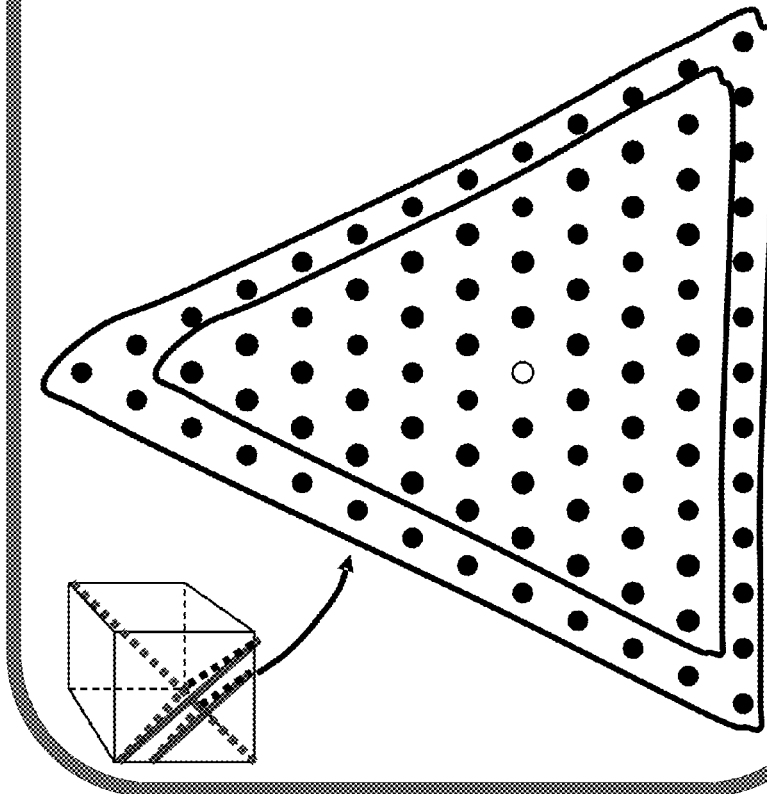

FIGS. 18-20 illustrate screenshots 1800, 1900, and 2000 that request that the user input color design goals to be used in the 3D LUT to be constructed. As shown, the screenshot 1800 requests that the user specify how the interior points (i.e. the "bulk" of the grid points) are mapped. Three choices are shown in this example: photographic, punchy, or exact monitor match. Other choices may be provided, either subjective or objective in nature. These choices are examples of the third design rule discussed above, relating to interior grid points. The screenshot 1900 requests the user to specify how the neutral axis is printed: black (K) toner only, CMYK blend, or mostly K, some CMYK mix. Other choices alternatively may be presented. The software could also default to a particular value for the neutral axis (or other regions), such as black (K) toner only. This choice related to the neutral axis is an example of the first design rule discussed above. The screenshot 2000 requests the user to specify how the faces are printed: extremely vivid, punchy, or photo-realistic, in the example shown. For choices that are more subjective in nature, the GUI could also present examples of how the color output might appear. This third screenshot illustrates how the second design rule (discussed above) may be input. The screenshots 1800, 1900, and 2000 collect inputs corresponding to design rules for the NAX color conversion object.

Figure 21:
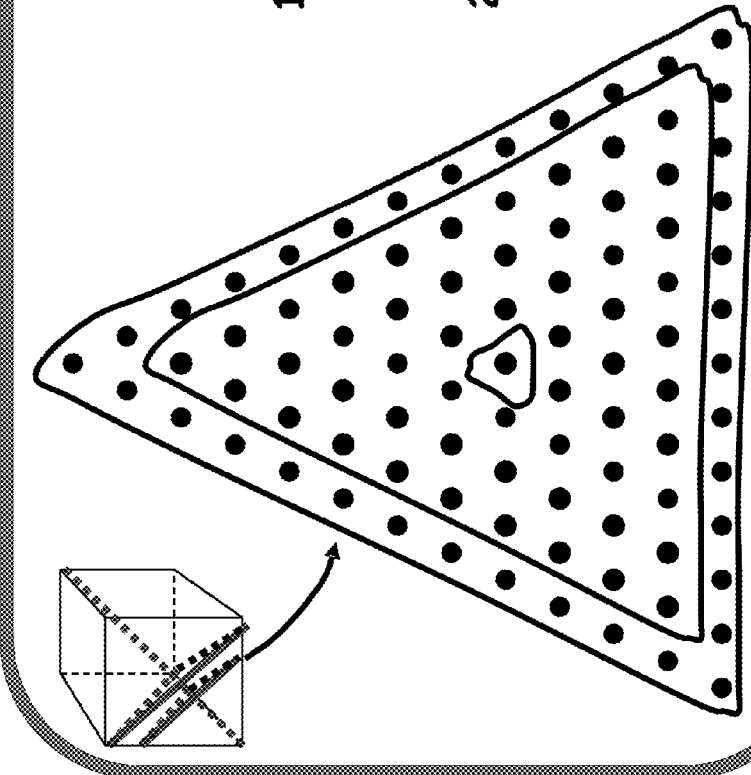

FIG. 21 illustrates a screenshot 2100 that requests the user to specify how the mappings corresponding to the selected design rules are blended. The blending will be applied to the interior points (between the neutral axis and faces points). In the example shown, the user is presented with two choices: 1) a blending based on the numerical "distance" among the input RGB values at grid points, and 2) a blending based on the colorimetric difference/distances among input grid points. The user's input is used by the software run by the processor to retrieve the selected RGB-to-CMYK mappings for the faces, neutral axis, and interior points (which are to be blended).

The blending of mapping for the interior grid points includes mixing the original CMYK output value at each grid point (since these RGB inputs are set for each grid point in the plurality of mappings prepared for device-to-device limitations and gamut mismatches, for example) with CMYK outputs of designated grid points (i.e. the neutral axis or face points, which both remain unchanged) according to the selected "distance" measure (see FIG. 20). Each interior grid point has designated neutral axis and face points, lying on a straight line in the same NAX plane. Since the designated neutral axis and face location may not lie on a grid point, the CMYK values needed for blending are interpolated from neighborhood neutral axis and face grid locations.

FIG. 22 illustrates a screenshot 2200 that may be displayed to the user to show the progress of NAX slice creation in the software running on the processor. This type of screen may be useful for slower processors or for larger 3D LUTs that require more calculations.

FIG. 23 illustrates a screenshot 2300 that may be displayed (in color) to the user to demonstrate what the resulting output would likely look like, based on the finished 3D LUT. The images presented in the screenshot 2300 could serve as a "soft proof" of color conversions contained in the 3D LUT. The goal of the screenshot 2300 is not as much geared toward color fidelity as it is toward a symbolic gesture of completion of the 3D LUT construction. This is because of the differences between the devices (display and printer). One feature that could be demonstrated with a reasonable level of fidelity is smooth transitions.

It should be understood that various changes and modifications to the embodiments presently described herein will be apparent to those skilled in the art. Such changes and modifications can be made without departing from the spirit and scope of the present subject matter and without diminishing its intended advantages. It is therefore intended that such changes and modifications be covered by the appended claims.

I claim:

1. A method for creating a run-time color-conversion look-up table comprising:
    forming a representation of a slice of a color conversion object, wherein the color conversion object is defined by a color coordinate system having a plurality of color axes and further includes a neutral axis, wherein each color axis includes values ranging from a respective minimum value to a respective maximum value, wherein the neutral axis includes values ranging from a minimum colorant amount to a maximum colorant amount, wherein the slice is defined by a plurality of grid points on the color coordinate system that are in a common plane orthogonal to the neutral axis, and wherein the slice is bound along a plurality of faces of the color conversion object for which at least one of the plurality of color axes is at a minimum or maximum value;
    receiving a user input that includes a parameter for a first design rule to be applied at an intersection of the slice with the neutral axis;
    receiving a user input that includes a parameter for a second design rule to be applied at grid points located on at least one of the faces of the color conversion object;
    determining outputs for grid points located between the intersection and the faces according to a third design rule; and
    storing the outputs for the slice in a portion of the look-up table.

2. The method of claim 1, further comprising repeating the determining and storing for a plurality of slices in the color conversion object.

3. The method of claim 2, wherein the determining and storing are repeated for all of the slices in the color conversion object.

4. The method of claim 1, wherein forming comprises displaying on an output device.

5. The method of claim 4, wherein the output device is a computer display and the conceptual representation is a graphical representation of the slice displayed on the display.

6. The method of claim 5, further comprising displaying more than one slice on the display.

7. The method of claim 1, wherein the color conversion object is a color conversion cube having six faces, wherein the plurality of faces are selected from the six faces, and wherein the neutral axis extends from a first vertex of the color conversion cube to a second vertex located at a diagonally opposite vertex of the color conversion cube, and wherein the plurality of color axes and the neutral axis each have their respective minimum values located at the first vertex.

8. The method of claim 1, further comprising printing an image on an image forming device using the look-up table.

9. The method of claim 1, wherein determining outputs for grid points located between the intersection and the faces includes altering a first mapping to blend the outputs smoothly across the slice, and wherein the altering is in accordance with the third design rule.

10. A method for creating a three-dimensional color-conversion look-up table, comprising:
    displaying at least a portion of a neutral-axis cross-sectional slice of a color-conversion cube for converting from a first color space associated with a first device to a second color space associated with a second device, the at least one neutral-axis cross-sectional slice having a plurality of co-planar grid points located thereon including a plurality of interior grid points located between an intersection with a neutral axis of the color-conversion cube and a plurality of grid points on a plurality of faces of the color conversion cube, and the at least one neutral-axis cross-sectional slice being orthogonal to the neutral axis;
    identifying a straight line connecting the intersection with a point on one of the faces of the color conversion cube, the straight line also passing through an interior grid point from the plurality of interior grid points;
    determining a first output corresponding to the intersection, wherein the first output is based on a first design rule;
    determining a second output corresponding to the point on the one of the faces of the color conversion cube, wherein the second output is based on a second design rule;
    determining a third output corresponding to the interior grid point, wherein the third output is based on a third design rule; and
    storing the first, second, and third outputs in the look-up table.

11. The method of claim 10, wherein the third design rule includes an interpolation that includes calculating a distance associated with the interior grid point.

12. The method of claim 11, wherein the distance is a distance in source color code values.

13. The method of claim 11, wherein the distance is a colorimetric difference between (a) the interior point and the intersection and (b) the interior point and the grid point on the face.

14. The method of claim 10, wherein the first design rule includes specifying an amount of colorant and wherein the second design rule includes specifying a color characteristic at a grid point on the face.

15. The method of claim 10, further comprising displaying portions of at least two neutral-axis cross section slices of the color-conversion cube.

16. The method of claim 10, further comprising:
    identifying additional straight lines connecting the intersection with additional points on the faces of the color conversion cube, the additional straight lines passing through additional interior grid points;
    determining additional second outputs corresponding to the additional grid points on the faces of the color conversion cube; and determining additional third outputs corresponding to the additional interior grid points.

17. The method of claim 10 wherein the second device comprises a printer, further comprising:
accessing the stored outputs in the look-up table to convert from the first color space to the second color space; and
printing using the accessed outputs.

18. The method of claim 10, wherein the third design rule includes a blend between the first design rule and the second design rule, and wherein the blend is determined by interpolation.

19. A non-transient computer readable medium comprising instructions for causing a processor to perform the following:
determine a size of a 3D look-up table to be created;
display a representation of at least a portion of a color-conversion object corresponding to the 3D look-up table;
receive inputs from a user specifying design rules to be applied to the look-up table;
apply the received design rules to the color-conversion object to determine output values for the color-conversion object; and
store the determined values,
wherein the 3D look-up table is an N×N×N look-up table,
wherein the color-conversion object is a cube having 3N−2 neutral-axis slices, and
wherein the displayed representation is an illustration of at least one of the neutral-axis slices.

20. The non-transient computer readable medium of claim 19, wherein the design rules include at least two of (1) a first design rule to be applied to each neutral-axis slice at an intersection with a neutral-axis of the color-conversion object, (2) a second design rule to be applied to at least one grid point on a face of the color-conversion object, and (3) a third design rule to be applied to at least one interior grid point located between the intersection and the face.

21. The non-transient computer readable medium of claim 20, wherein the third design rule includes interpolating to determine blended values for the color-conversion object for points between the neutral axis and the face, and wherein the instructions further comprise receiving an input from the user specifying how the interpolation is to be performed.

22. The non-transient computer readable medium of claim 21, wherein the interpolation is based on a distance.

23. The non-transient computer readable medium of claim 22, wherein the distance is selected from the group consisting of a colorimetric distance and a distance in source color code values.

24. The non-transient computer readable medium of claim 19, wherein causing the processor to apply the received design rules to the color-conversion object to determine the output values includes causing the processor to access at least one predetermined color mapping.

* * * * *